(12) United States Patent
Francavilla

(10) Patent No.: US 9,151,046 B1
(45) Date of Patent: Oct. 6, 2015

(54) CONCRETE SLAB HAVING INTEGRAL WALL BASE FORMS AND WALL BASE PLATES FOR AUTOMATED CONSTRUCTION AND SYSTEM THEREOF

(71) Applicant: John Joseph Francavilla, West Palm Beach, FL (US)

(72) Inventor: John Joseph Francavilla, West Palm Beach, FL (US)

(73) Assignee: PRECISION DESIGN LLC, Cheyenne, WY (US)

( * ) Notice: Subject to any disclaimer, the term of this patent is extended or adjusted under 35 U.S.C. 154(b) by 0 days.

(21) Appl. No.: 14/292,091

(22) Filed: May 30, 2014

Related U.S. Application Data

(63) Continuation-in-part of application No. 14/063,765, filed on Oct. 25, 2013, now Pat. No. 8,739,494, which is a continuation of application No. 13/597,620, filed on Aug. 29, 2012, now Pat. No. 8,567,153, which is a continuation-in-part of application No. 13/451,927, filed on Apr. 20, 2012, now abandoned.

(60) Provisional application No. 61/477,677, filed on Apr. 21, 2011.

(51) Int. Cl.
| | |
|---|---|
| *E04B 1/18* | (2006.01) |
| *E04B 2/84* | (2006.01) |
| *E04C 2/52* | (2006.01) |
| *E04B 2/18* | (2006.01) |
| *E02D 27/02* | (2006.01) |
| *E04G 21/02* | (2006.01) |
| *E04B 2/54* | (2006.01) |
| *F16B 21/09* | (2006.01) |
| *E04B 2/86* | (2006.01) |
| *E04C 2/06* | (2006.01) |
| *E04C 2/38* | (2006.01) |

(52) U.S. Cl.
CPC . *E04B 2/84* (2013.01); *E02D 27/02* (2013.01); *E04B 2/18* (2013.01); *E04C 2/52* (2013.01); *E04G 21/02* (2013.01); *E04B 2/54* (2013.01); *E04B 2/86* (2013.01); *E04C 2/06* (2013.01); *E04C 2/384* (2013.01); *F16B 21/09* (2013.01)

(58) Field of Classification Search
CPC ........... E04C 2/06; E04C 2/384; E04B 2/848; E04B 2/54; E04B 2/86; F16B 21/09
USPC ......... 52/414, 309.15, 309.12, 309.4, 741.13, 52/309.8, 309.13, 309.14, 309.17, 253, 52/405.1, 251, 453
See application file for complete search history.

(56) References Cited

U.S. PATENT DOCUMENTS

| | | |
|---|---|---|
| 2,412,744 A | 12/1946 | Nelson |
| 3,258,889 A | 7/1966 | Butcher |

(Continued)

*Primary Examiner* — Chi Q Nguyen
(74) *Attorney, Agent, or Firm* — Malin Haley DiMaggio & Bowen, P.A.

(57) ABSTRACT

A composite automated building construction system, with automated alignment of various truss and wall sections, includes a wall section having frame, an expanded wallboard, and a concrete layer. The wallboard includes an outer portion and inset portion wherein the wallboard is attached to the frame with the outer portion covering an exterior side of the frame and the inset portion is disposed within the frame. The wallboard thus provides exterior and interior insulation for the system. The concrete layer is sprayed on to the outer portion of said wallboard, forming a strong durable composite construction system. A building is constructed with these wall sections by way of a base form template delimiting the boundary of the building. The base forms are installed and then a concrete foundation slab is poured over the base forms. Pre-installed bolts extend above the concrete foundation to providing pre-determined mounting points for the frames for the wall sections.

11 Claims, 27 Drawing Sheets

(56) References Cited

U.S. PATENT DOCUMENTS

| | | | |
|---|---|---|---|
| 4,454,702 A | | 6/1984 | Bonilla-Lugo et al. |
| 4,751,803 A | | 6/1988 | Zimmerman |
| 4,934,121 A | * | 6/1990 | Zimmerman ............... 52/583.1 |
| 5,055,252 A | * | 10/1991 | Zimmerman ............... 264/263 |
| 5,522,194 A | | 6/1996 | Graulich |
| 6,003,278 A | | 12/1999 | Weaver et al. |
| 6,263,638 B1 | | 7/2001 | Long, Sr. |
| 6,418,686 B1 | | 7/2002 | Record |
| 6,519,904 B1 | | 2/2003 | Phillips |
| 6,698,150 B1 | * | 3/2004 | DiLorenzo .................... 52/414 |
| 7,017,316 B2 | * | 3/2006 | DiLorenzo .................... 52/414 |
| 7,735,271 B1 | | 6/2010 | Shipston et al. |
| 7,785,685 B2 | | 8/2010 | Fay et al. |
| 7,828,544 B2 | * | 11/2010 | Di Lorenzo .................. 425/441 |
| 7,958,687 B2 | * | 6/2011 | Dilorenzo ..................... 52/319 |
| 8,567,153 B1 | * | 10/2013 | Francavilla ................ 52/741.13 |
| 8,739,494 B2 | * | 6/2014 | Francavilla ................ 52/741.13 |
| 2012/0096785 A1 | | 4/2012 | Weeks |

* cited by examiner

```
┌─────────────────────────────────────────────────────┐
│           ROOF TRUSS/ FLOOR TRUSS/                  │
│ HOUSE MEMBERS/ FOR BUILDING BROUGHT TO JOB SITE AND │
│  ALIGNED WITH CORRESPONDING TOP TRACK FORM OF       │
│              OUTER WALL SECTIONS                    │
└─────────────────────────────────────────────────────┘
                          │
┌─────────────────────────────────────────────────────┐
│  ALIGNMENT HOLES ARE DRILLED AND PUNCHED THROUGH    │
│   ROOF TRUSS/ FLOOR TRUSS BOTTOM CHORD BASE FORMS   │
│   CORRESPONDING TO ALIGNMENT HOLES IN UPPER TRACK   │
│       OUTER FRAME MEMBERS OF WALL SECTIONS          │
└─────────────────────────────────────────────────────┘
                          │
┌─────────────────────────────────────────────────────┐
│  UPPER OUTER FRAME MEMBERS OF WALL SECTIONS ARE     │
│   SECURED TO BOTTOM CHORD OF ROOF TRUSS/ FLOOR      │
│     TRUSS FORMS BY NUT AND BOLT CONFIGURATION       │
└─────────────────────────────────────────────────────┘
                          │
┌─────────────────────────────────────────────────────┐
│ INTERIOR WALL FRAME MEMBERS ARE BROUGHT TO JOB SITE │
│ AND ALIGNED WITH CORRESPONDING STUD FRAME CROSS     │
│         MEMBER FORM OF OUTER WALL SECTION           │
└─────────────────────────────────────────────────────┘
                          │
┌─────────────────────────────────────────────────────┐
│  ALIGNMENT HOLES ARE DRILLED AND PUNCHED THROUGH    │
│  INTERIOR WALL FRAME MEMBER MIDDLE STUD CORRESPON-  │
│  DING TO ALIGNMENT HOLES IN CROSS STUD OUTER FRAME  │
│              MEMBERS OF WALL SECTIONS               │
└─────────────────────────────────────────────────────┘
                          │
┌─────────────────────────────────────────────────────┐
│  INTERIOR WALL FRAME MEMBERS OF WALL SECTIONS ARE   │
│   SECURED TO MIDDLE STUD OUTER FRAME MEMBERS OF     │
│    WALL SECTION FORMS BY NUT AND BOLT CONFIGURATION │
└─────────────────────────────────────────────────────┘
```

FIG. 12A

CONCRETE SLAB HAVING INTEGRAL WALL BASE FORMS AND WALL BASE PLATES FOR AUTOMATED CONSTRUCTION AND SYSTEM THEREOF

CROSS REFERENCE TO RELATED APPLICATIONS

This application is a continuation-in-part of U.S. patent application Ser. No. 14/063,765 filed on Oct. 25, 2013, now U.S. Pat. No. 8,739,494, which is a continuation of U.S. patent application Ser. No. 13/597,620 filed on Aug. 29, 2012, now U.S. Pat. No. 8,567,153 issued Oct. 29, 2013, which is a continuation-in-part of U.S. patent application Ser. No. 13/451,927 filed on Apr. 20, 2012, which claims the benefit of U.S. Provisional Application No. 61/477,677 filed on Apr. 21, 2011.

BACKGROUND OF THE INVENTION

1. Field of the Invention

This invention relates to systems and methods of building construction and more particularly to systems and methods including a composite of concrete, framing, and other materials and structures.

2. Description of Related Art

Conventional building construction typically comprises three primary systems and methods: (1) wood stud construction; (2) concrete block construction; and (3) concrete panel construction. Wood stud construction system requires skilled carpenters to assemble the pieces and cut lumber according to structural drawings that require skilled interpretation. Concrete block construction, wherein the perimeter of a housing unit is comprised of arranged cinder blocks or concrete blocks in a structurally sound fashion, is slow to put into place and requires a large number of skilled masons to carry out effectively. Concrete panel construction, wherein pre-cast panels are put into place against or in conjunction with a framing system, requires heavy equipment to lift and place the concrete panels, as well as a skilled work force to build the structure that provides the framing template for the panels.

Accordingly, the development of better building systems for constructing low cost, efficient and easily built housing units has been slowed by the need for skilled labor to assemble the components required for the housing unit. In many locales, skilled labor is in short supply and/or prohibitively expensive which has restricted the ability to construct low cost housing units en masse, particularly in underdeveloped countries. Other problems with present building construction technology include the need to build housing units at a low cost and quickly, the ability to build housing units having a resilient construction that does not require a great deal of maintenance, is strong structurally, and provides desired insulation from the elements. Thus, in many countries, the aspirations of having modernized housing units have slowly waned.

Furthermore, present construction methods typically rely on steel stud frames having insulation sprayed or placed on the interior side of the stud wall. Such an arrangement is not as efficient as possible because heat can be conducted from wall surfaces directly to the frame elements, circumventing the surrounding insulation. Providing external insulation, i.e. insulation placed on the outside of the stud frame can be helpful, but to date there has not been a reliable means to applying such insulation. Further, insulation placed only externally will not provide sufficient heat and cold protection and therefore spray or roll insulation will still have to be provided on the inside wall. Thus, the construction can be rendered expensive, cumbersome, and labor intensive.

Several attempts have been made at providing cheaper and more efficient construction methods, however none have adequately address the need for an easier to assemble yet structurally sound and insulative construction. For example, U.S. Pat. No. 4,751,803 to Zimmerman describes a construction method wherein precast concrete studs having protruding fasteners are used to build the framework of the walls of a structure. The walls are assembled in a horizontal plane and rigid sheet insulation is attached to concrete studs and wire mesh is laid upon the sheet insulation. Concrete is then poured onto the insulation, the wire, and the protruding fasteners to form a waterproof outer surface. Beams are bonded to the studs. After construction, the structure can be transported to the construction site and assembled. The patent also discloses a "jig" for assembling the structure. Thus, while providing a means for prefabricating building walls, Zimmerman relies on the use of a jig or form mold in which concrete is poured prior to transportation to the construction site. This severely limits the accessibility of the invention because the relatively heavy poured concrete slabs are expensive and difficult to transport to remote locations, particularly those where affordable housing is desired. Further, the complex stud framing structure renders the system expensive to manufacture and assemble. Finally, the system does not provide for both internal and external insulation of the walls.

U.S. Pat. No. 5,522,194 to Graulich describes a planar building panel core having two faces coated with a cementitious material whereby the core is a closed-cell foam insulation board. A metal grid or lath is laid over the foam before the cement is applied. The core panel includes a plurality of spaced metal furring vertical channel members which are fastened to a support structure and a steel reinforcing sheet spanning the face of each panel, thus comprising a frame surrounding the foam insulation board. Cement is applied over the metal grid and the foam board to result in a unitary construction panel. While providing a relatively sound system, this construction invention is flawed in that there is no means for prefabricating any aspect of the design and it requires extensive assembly of the frame elements around the foam board during construction of the system. Assembly cannot be complete using standard hand tools by unskilled labor. Further, the foam board is not disposed on the exteriors of the frame and therefore the structural rigidity and insulative properties are compromised.

Similarly, U.S. Pat. No. 6,519,904 to Phillips describes a vertical reinforced concrete wall having a plurality of insulating panels horizontally spaced from each other formed of a polystyrene material. A pair of channel-shaped vertical side members are fitted over the respective side edges of the insulating panel during onsite installation. The panels are then mounted between a pair of opposed upper and lower channel-shaped track members which extend horizontally to define the upper and lowers ends of the vertical wall. A wire mesh is attached to the outside of the side members and horizontal members and concrete is applied over the wire mesh, insulation board, and framing members. Again, the complex framing structure is disposed around the foamboard and includes numerous interconnected parts which renders the system difficult to assemble and not amenable to affordable housing construction by unskilled workers. Finally, the construction method does not provide both internal and external insulation at the wall surface.

In contrast, the present invention provides an improved building construction system and method designed to addressed the problems outlined above and provides a systemized product that provides housing for residential or commercial use, can be economically constructed, does not need high level and expensive skilled labor, is extremely strong and weather resistant, has excellent internal and external thermal insulation capabilities, and requires low maintenance. It is, therefore, to the effective resolution of the aforementioned problems and shortcomings of the prior art that the present invention is directed. However, in view of the building construction system and methods in existence at the time of the present invention, it was not obvious to those persons of ordinary skill in the pertinent art as to how the identified needs could be fulfilled in an advantageous manner.

SUMMARY OF THE INVENTION

The present invention provides a composite building construction wall section, comprising: a frame, wallboard, and a concrete layer. The wallboard comprises an outer portion and inset portion wherein the wallboard is attached to the frame with the outer portion covering an exterior side of the frame and the inset portion is disposed within the frame. The wallboard thus provides exterior and interior insulation for the system. The wallboard may be attached to the frame by an adhesive or by common fasteners. The concrete layer is sprayed on to the outer portion of said wallboard, forming a strong durable composite construction wall section.

In some embodiments, one or more rebar supports are attached to the frame at the exterior side of said frame and are spaced apart from the wallboard. The rebar supports are secured to the frame by one or more key bolts which pass through the wallboard and into the frame and are lockingly engaged with the frame. The frame may include key holes with correspond to the lock ends of the key bolts, which bolts may be secured by inserting and rotating them within the frame. A wire grid may be attached to the one or more key bolts and is spaced apart from the wallboard and the rebar supports whereby the grid and the rebar provide a support structure for the concrete layer. In some embodiments, the concrete layer is 3 inches thick.

In some embodiments, the frame includes a plurality of outer framing members and one or more cross members. The inset portion of the wallboard includes one or more channels configured to accommodate the one or more cross members of the frame and thus fit snugly inside the frame. In some embodiments, the outer framing members and the one or more cross members include one or more apertures for the routing of electrical wires or plumbing and the apertures are adapted to receive conduits for protecting the electrical wires and the plumbing. The wallboard may also include channels to accommodate the conduits. One or more guide wires may be attached to the frame by key bolts at the exterior side of said frame, the guide wires spaced apart from said wallboard and adapted to indicate the depth of the concrete layer to be applied.

In some embodiments, the frame sections are manufactured using a computer system that prefabricates and codes the frame sections for easy assembly. The interior side of the frames is configured to receive drywall or other finishing material. In some embodiments, the frame comprises high tensile steel and the wallboard comprises expanded polystyrene. The wallboard may be dimensioned such that the depth of the inset portion is greater than the depth outer portion of said wallboard. In any event, the wallboard provides significant external and internal insulation: a substantial advantage over the prior art.

A housing unit or building may be constructed by providing one or more frame sections each prefabricated and coded according to a building plan. The frame sections are assembled together to form a housing structure. Then the wallboard is attached to the frame sections, the rebar supports and wire grid is attached to the wallboard, the guide wire is installed and then concrete is sprayed over the wire grid, rebar, and wallboard until the relatively thick concrete layer is formed. Optionally, the guide wire may be used to indicate the depth of the concrete to be applied. Once the concrete has been cured, it can be finished with paint, stucco, or other known housing unit finish materials. The interior side of the frame can be finished with drywall.

The structural integrity of the present construction wall section is greatly enhanced due to the relatively thick concrete layer applied to the wallboard-frame combination. The completely structure is capable of withstanding hurricane force winds, earthquakes, and other weather conditions whereby the structure exceeds national and local building codes to that effect. The present invention provides a substantial improvement over the prior art with respect to the simplicity and cost of construction, as it does not require skilled laborers such as masons, carpenters, and the like. The prefabrication and coding of the frame sections enhances the ease-of-build even more. More importantly, the expanded wallboard provides both internal and external insulation in a single easy to assemble piece which also provides a surface for adhesion to the concrete layer. The combined internal and external insulative properties of the wallboard provide a significant advantage over known building construction walls and wall structures and also provide enhanced modularity and ease of installation.

In addition to the wall section itself, the present invention provides an improved system and method of erecting and assembling a housing structure using the wall sections described above. This Perfect Slab™ and automated alignment system and method begins by providing a plurality of base forms around the boundary of the foundation of a building or dwelling. The base forms each comprise an upper runner and a lower runner, wherein the upper runner and the lower runner are supported and interconnected by one or more cross runners. The base forms are configured to be embedded in a concrete foundation slab for the building whereby the wall sections disclosed herein are attached to the base forms in a pre-determined, pre-holed, pre-coded, and/or pre-dimensioned fashion. This greatly simplifies construction and installation of a building comprised of the present wall sections by essentially provided the base forms as a template for the eventual wall sections. The method of construction utilizing the base forms and wall sections comprises: providing a building plat defining a boundary for said building; pouring one or more foundation footers and providing the foundation footers around the boundary; providing one or more base form sections around the boundary of the building, at least one of the base forms disposed on the foundation footers; providing one or more lower outer frame members of one or more wall sections; attaching the lower outer frame members to a top runner of each of said base form sections by one or more bolts extending from the top runner; pouring concrete on and around the base form sections to form a concrete foundation slab of the building, wherein at least a portion of the bolts are exposed above said foundation slab; removing the lower outer frame members from the base form sections; assembling the one or more wall sections each including a frame comprising in part the lower outer frame member; attaching the assembled wall sections to the exposed bolts such that the base forms support each of the assembled wall sections; attaching wallboard to the outside of each of the frame sections; and, spraying a layer of concrete over the wallboard. One or more straps that contact opposite base form members can also be utilized to prevent side-by-side movement or undesired slippage.

Accordingly, it is an object of the present invention to provide a structurally sound and insulative building construction composite.

It is yet another object of the present invention to provide a building construction system and method that does not require skilled labors to assemble and construct.

It is yet another object of the present invention to provide a building construction system and method that incorporates automated alignment of wall components, wall sections, truss sections, floor sections, and/or frame sections.

It is yet another object of the present invention to provide a building construction system and method that includes a relatively thick concrete layer provide substantial structural rigidity at a decreased cost.

It is yet another object of the present invention to provide a building construction system and method that provides internal and external insulation without the need for insulation batting or spray insulation applications.

It is yet another object of the present invention to provide a building construction system and method that incorporates a unitary wallboard piece having an outer portion for external insulation and concrete adherence as well as an inset portion received with the frame for internal insulation.

It is yet another object of the present invention to provide a building construction system and method that utilizing locking key bolts received in frame sections which allow for the rapid assembly of rebar supports and wire guides to further enhance the speed, accuracy, and quality of the building construction system and method.

It is yet another object of the present invention to provide a building construction system and method that can be assembled more quickly than typical construction methods, even with the use of unskilled laborers.

It is yet another object of the present invention to provide a system and method of building construction utilizing base forms that form a template around the boundary of the building or dwelling for the support and installation of one or more exterior or interior wall sections, truss sections, roof sections, and floor sections in accordance with the structure and function disclosed herein.

In accordance with these and other objects which will become apparent hereinafter, the instant invention will now be described with particular reference to the accompanying drawings.

BRIEF DESCRIPTION OF THE DRAWINGS

FIG. 12A is a flow chart depicting one embodiment of the construction method of the present invention utilizing roof truss, floor truss and house members in conjunction with base forms and wall sections described herein.

DETAILED DESCRIPTION

Figure 1:
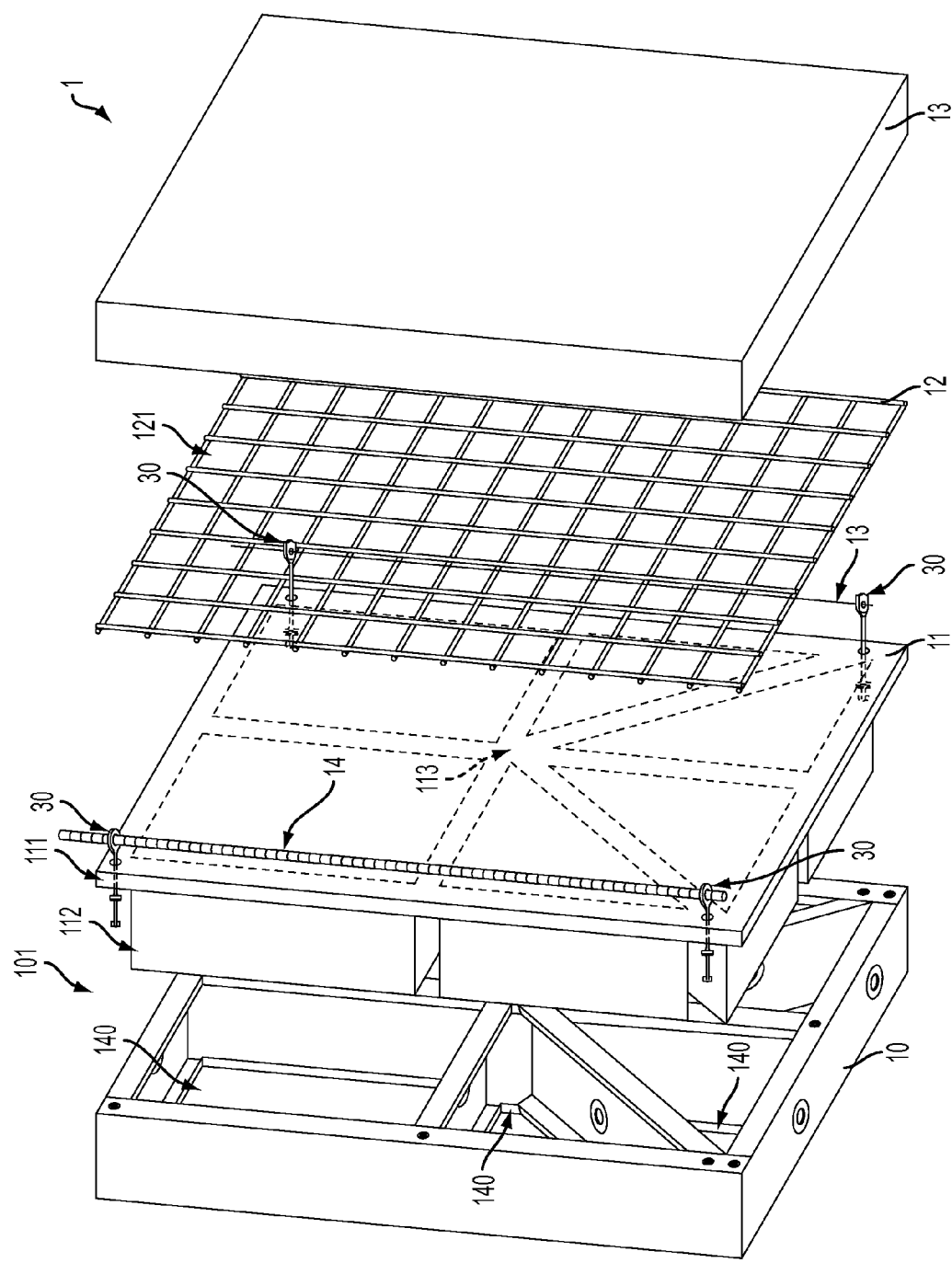
FIG. 1 is an exploded schematic of one embodiment of the building construction wall section of the present invention.

The present invention overcomes the disadvantages of the prior art by incorporating a combination of sprayed concrete onto an internal and external insulating board which is cladding a steel stud frame. With reference to FIG. 1, shown is an exploded schematic of one embodiment of the wall section of the present invention arranged and constructed in accordance with one embodiment of the method of the present invention. Shown is a section, or a portion of a composite construction wall identified as wall section 1. Wall section 1 comprises a frame 10, a wallboard 11, a support grid 12, and a concrete layer 13. The wall section 1 is provided as a wall structure for a building or housing unit and will typically be assembled in sections as described in detail below.

Figure 2:
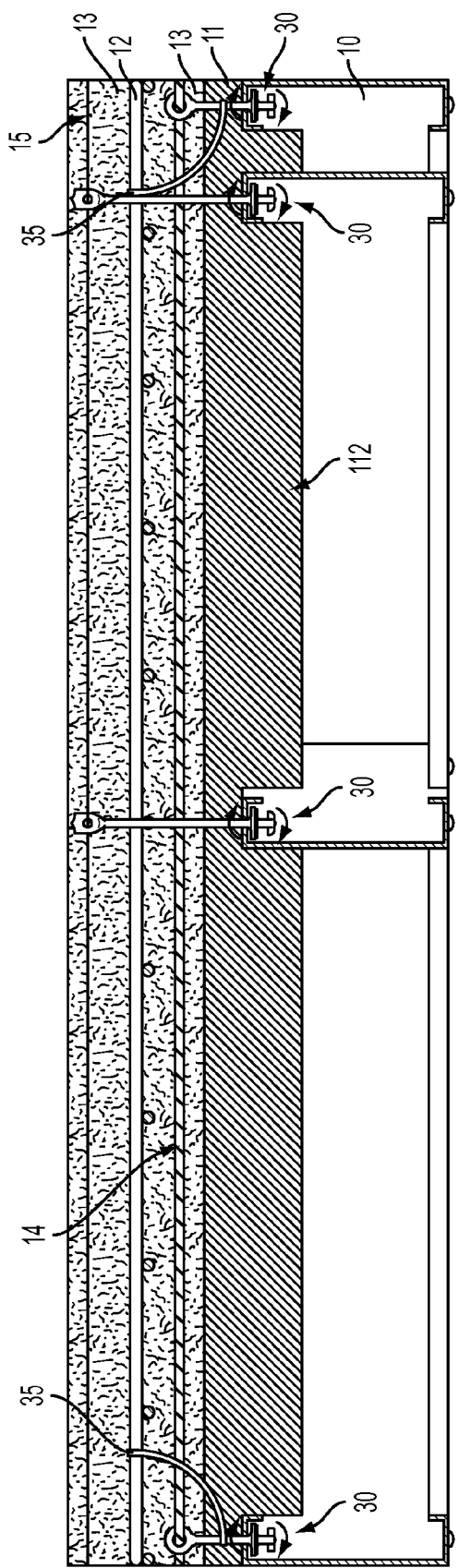
FIG. 2 is a cross-sectional cutaway view of one embodiment of the building construction wall section of the present invention.
Figure 3:
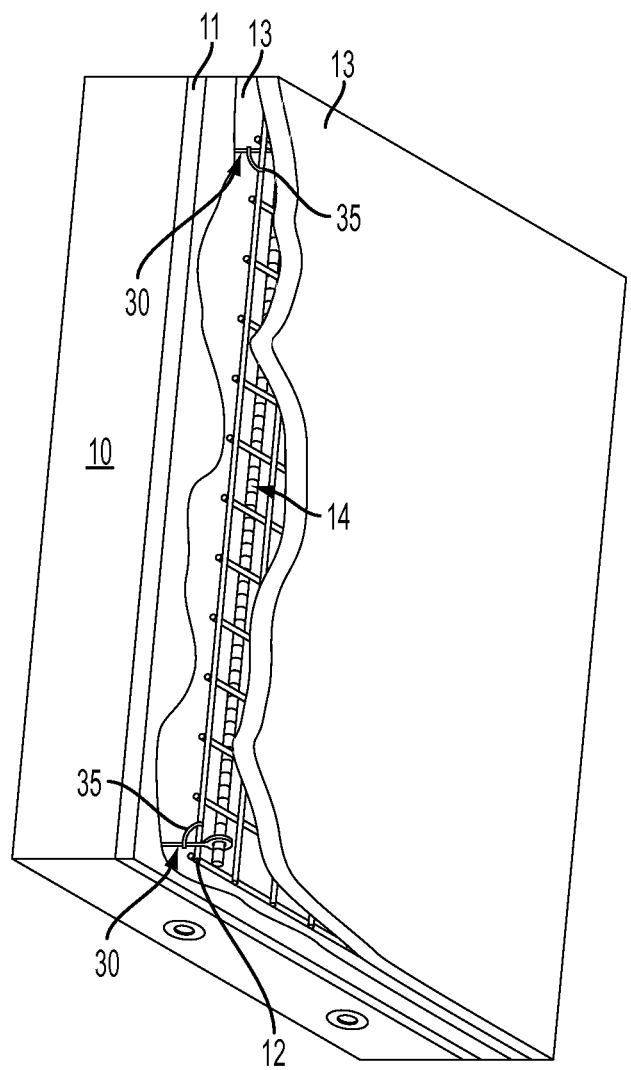
FIG. 3 is a perspective view of one embodiment of the building construction wall section of the present invention.

With reference to FIGS. 1 and 2, the wallboard 11 is secured to and disposed on an exterior side 101 of the frame 10. In some embodiments, wallboard 11 is secured to frame 10 by an adhesive such as an epoxy or glue. In some embodiments, wallboard 11 is further fastened to frame 10 by one or more key bolts 30 received through wallboard 11 and terminating within a portion of frame 10. A plurality of bolts 30 may be provided through wallboard 11 and into frame 10 to provide a secure attachment of the two components. Specifically, the bolts 30 may include eyelets that are configured to receive and secure rebar support 14 and/or guide wire 15 which provide additional support and guidance for the application of the concrete layer 13, as discussed in further detail below. In some embodiments, the key bolts 30 are configured to lockingly engage pre-fabricated key holes provided in the frame 10 to allow for ease of installation, as further described below. However, other fasteners may be used instead of bolts, such as screws, nails, staples, and the like.

Also provided in some embodiments is the support grid 12 which is spaced apart from but attached to wallboard 11. Grid 12 may comprise a wire mesh grid, a rebar grid, or similar rigid grid that provides additional structural support for concrete layer 13. In some embodiments, grid 12 is attached to either rebar support 14 or one or more bolts 30 by ties 35 which are received around both the grid 12 and either the rebar support 14 or a bolt 30. Other means of connecting the grid 12 may be employed, including brackets, screws, bolts, staples, and the like. In some embodiments, the wire grid 12 is disposed between the wallboard 11 and the guide wire 15 such that the guide wire 15 is on the outside of the wall section 1. The rebar support 14 is disposed between the wallboard 11 and the grid 12. Further, it is appreciated that one or more rebar supports 14 may be provided, with corresponding bolts, and the rebar supports 14 may be disposed horizontally and/or vertically, or in a frame-like manner around the periphery of the frame 10.

In some embodiments, concrete layer 13 is sprayed over grid 12 such that the concrete adheres to wallboard 11 and has a thickness extending away from wallboard 11. Grid 12 and/or rebar 14 provide structural support for the adherence of concrete layer 13 to wallboard 11. In some embodiments, concrete layer 13 is applied in multiple thin-layer applications in order to assure adherence and structural rigidity with respect to wallboard 11. The guide wire 15 is disposed across the wallboard and may provide guidance during the application of the concrete layer 13, i.e. to delimit the desired depth of concrete layer 13 application. As depicted in FIG. 2, concrete layer 13 is applied such that grid 12 and rebar 14 is disposed within the concrete layer 13; or, said differently, concrete layer 13 is disposed on either side of grid 12 and/or rebar 14 and, in many cases, will be disposed through grid 12 wherein grid 12 includes interstitial gaps 121 (FIG. 1) by way of its grid configuration. In some embodiments, it is preferred that concrete layer 13 have a thickness of approximately 2-3 inches extending from the wallboard however the thickness may vary depending on the desired application and building plan. The grid 12 provides support for and catches the concrete layer 13 during application to prevent the concrete from sliding down the wall surface. The rebar supports 14 provide structural reinforcement once the concrete layer 13 has set. In FIG. 2, it is appreciated that the guide wire 15 provides a designation of the depth of concrete layer 13 to be applied. In some embodiments, the guide wire 15 will be flush with the outer edge of the concrete layer 13. However, for illustrative purposes in FIG. 2, the guide wire 15 is shown to be contained inside the concrete layer somewhat—such a configuration is not required nor should the depth of the concrete layer 13 and relationship to guide wire 15 be limited to that shown in FIG. 2.

Figure 4:
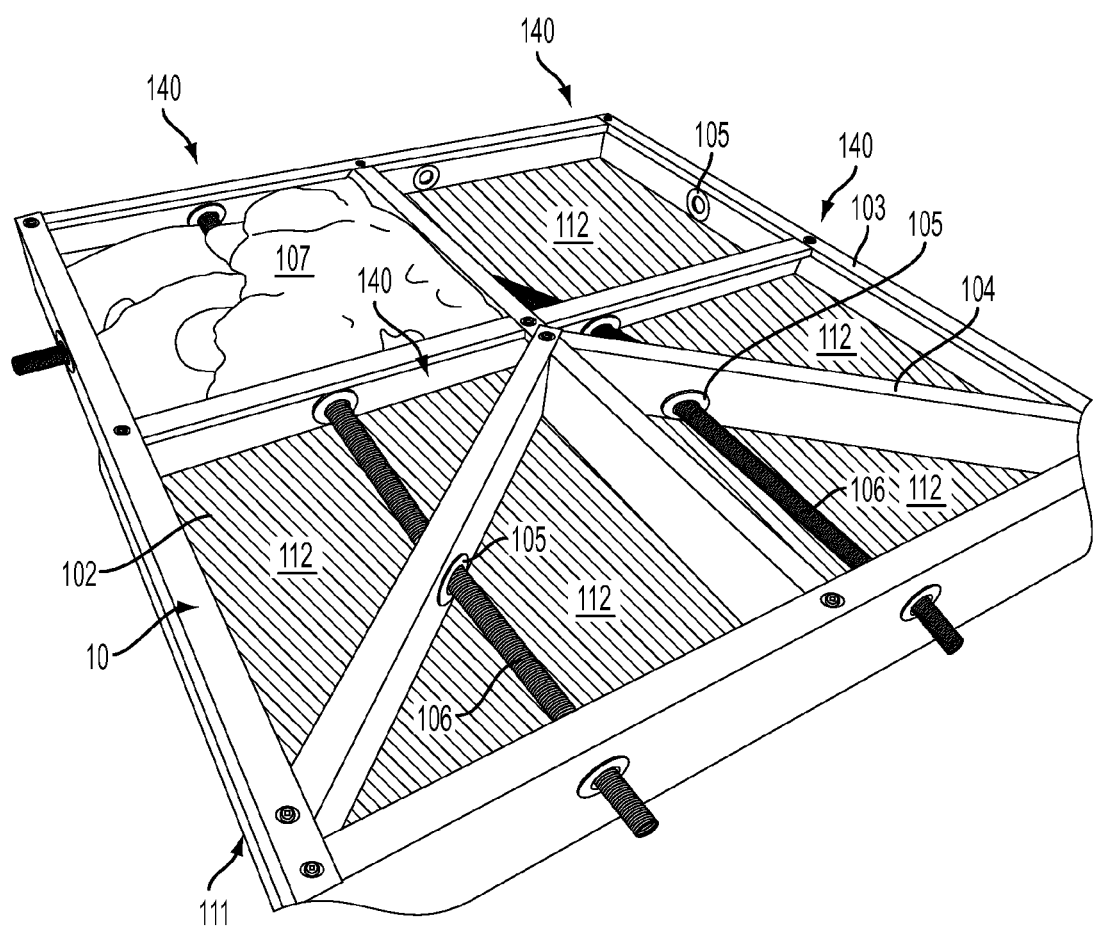
FIG. 4 is another perspective view of one embodiment of the wall section of the present invention.

In some embodiments, the stud frame 10 of the present invention is constructed through use of a fabricating machine which forms the studs from coiled metal (steel, aluminum, and the like) and marks the components with coding to allow for quick, easily assembled construction by workers who do not need high level construction skills, rather they need only to match the markings for assembly. FIG. 4 shows an example of one section of frame 10 shown having a generally square or rectangular shape. Shown is frame 10 from the perspective of interior side 102 with wallboard 11 attached to the exterior side of frame 10. Frame 10 may include outer framing members 103 and one or more cross members 104, which functions as studs, providing a riding structural support system for building construction.

Wallboard 11 comprises an insulative material and is configured to provide both external and internal insulation for the construction system in a unitary piece. As shown in FIGS. 1, 2, 4, 5 and 6 wallboard 11 is configured as having an outer portion 111 and an inset portion 112 wherein the inset portion 112 is configured to be received within the interior cavities 140 of the frame 10 and the outer portion is disposed on the exterior side of the frame 10. In some embodiments, the inset portion 112 and the outer portion 111 are unitary and integral, constructed homogenously as wallboard 11. The outer portion 111 provides external insulation and provides a surface for the concrete layer 13 to adhere to. The inset portion 112 provides internal insulation and adds rigidity to construction wall section 1 once assembled. In some embodiments, the inset portion 112 is deeper than the outer portion 111, for example the inset portion 112 may have a depth of 2 inches extending into the frame 10 whereas the outer portion 111 has a depth of 1 inch extending outward from the frame 10. In some embodiments, the perimeter of the outer portion 111 is larger than the perimeter of the insert portion 112.

Figure 5:
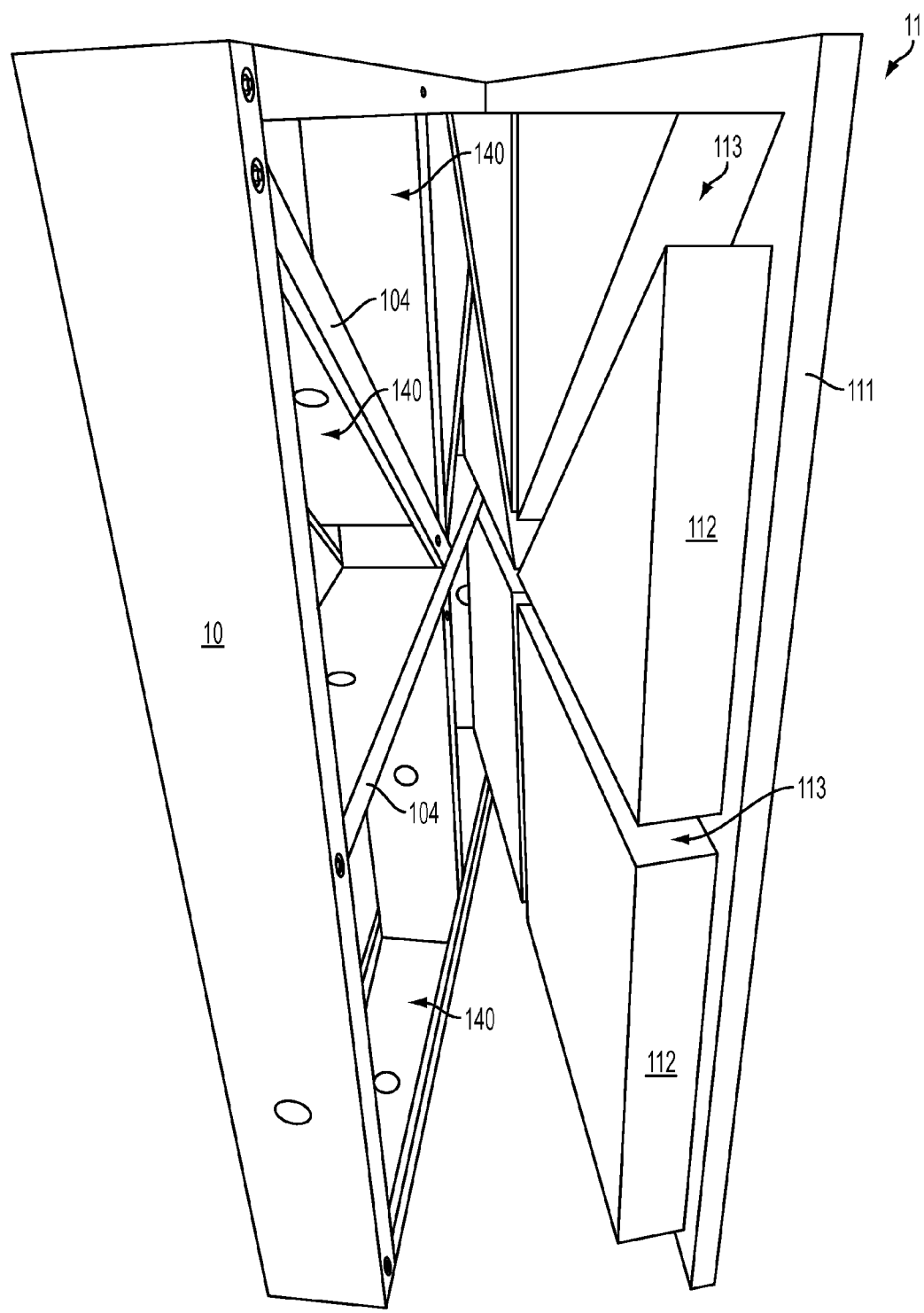
FIG. 5 is a perspective view of one aspects of the frame and wallboard configuration of the present invention.
Figure 6:
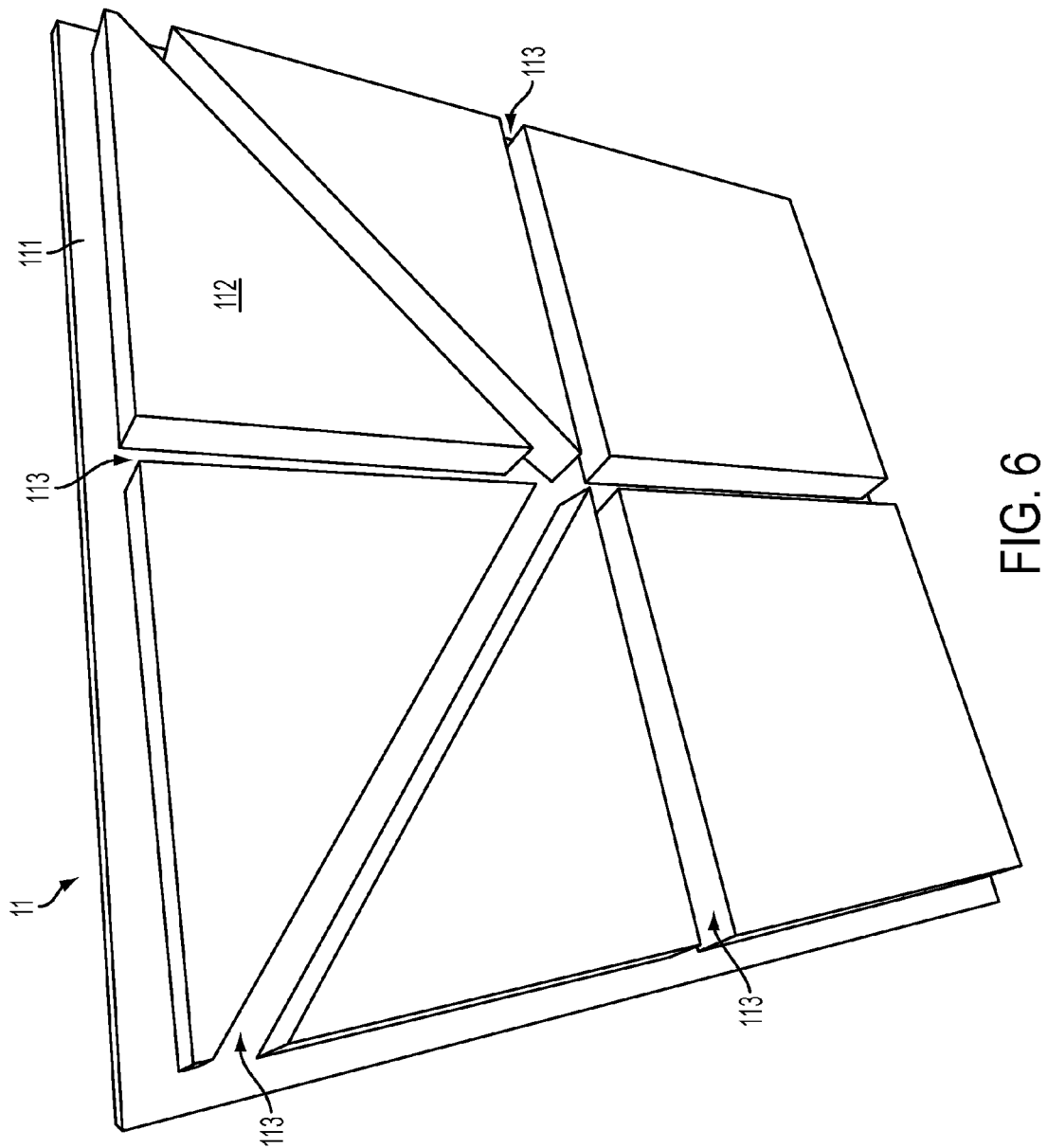
FIG. 6 is a perspective view of one embodiment of the wallboard of the present invention showing the inset portion, outer portion, and channels.

In some embodiments, the inset portion 112 includes one or more channels 113 which are configured to accommodate the cross members 104 of the frame 10. This allows the inset portion 112 wallboard 11 to fit snugly and securely within the internal cavities 140 of frame 10 with minimal movement, which eases construction and assembly and provides added rigidity and stability to the construction wall section 1. FIG. 5 demonstrates the configuration of the outer portion 111 and inset portion 112 of wallboard 11 as well as the fitment of same inside the internal cavities 140 of frame 10 by way of channels 113. FIG. 6 shows the wallboard 11 along, with outer portion 111, inset portion 112, and channels 113. It is appreciated that the relative thickness of outer portion 111 and inset portion 112 can vary depending on the desired application and desire structural and insulative properties. Further, the configuration, size, and shape of the channels 113 can vary depending on the configuration of frame 10. Accordingly, the present invention is not limited to the configurations shown in the figures.

In some embodiments, the framing members 103 and 104 include one or more apertures 105 punched there-through. The apertures 105 are configured to receive and channel electrical wiring, plumbing, and the like. In some embodiments, conduits 106 are provided through apertures 105 and provide protection for wiring or plumbing passed there-through. As shown in FIG. 4, in some embodiments the inset portion 112 of wallboard 11 has a depth that accommodate and does not block apertures 105 and conduits 106, which conduits are adjacent to the inside surface of the wallboard 11. In other embodiments, it may be desired for the depth of inset portion 112 to be somewhat deeper where it would otherwise cover up or block the apertures 105. However, in this case, additional channels 113 can be provided which align with apertures 105 and therefore accommodate conduits 106 similar to how the channels 113 accommodate the cross members 104 of frame 10.

In some embodiments, the inside of the frame 10 at interior side 102 of frame 10 may receive and contain insulation material 107 which may be poured, sprayed, or applied in sheets or rolls thereto. In some embodiments, the insulation will be applied to the back of inset portion 112 of the wallboard 11, which is disposed within the frame 10. However, insulation material 107 may not be necessary in situations and climates where the wallboard 11 with inset portion 112 provides sufficient insulation. Accordingly, the material selected for wallboard 11 may vary depending on desired insulative characteristics as further discussed below. Additionally, the depth of inset portion 112 of wallboard 11 can be increased in order to increase its ability to insulate, depending on the desired application and installation.

It is further appreciated that the interior side 102 of frame 10 is typically the side facing the inside of the particular building or home and the exterior side 101 (which receives wallboard 11, grid 12, and cement layer 13) is the exterior of the building or home. The interior side 102 may be finished with typical interior wall material such as drywall, plasterboard, sheet rock, and the like.

The result of the present invention is a combined building or housing frame 10 structure covered with an insulating exterior wallboard 11 to which a sprayed concrete layer 13 has been applied. Each frame 10 as described above comprises at least a portion of a wall of a building or housing structure. This configuration provides substantial strength and durability and exceeds typical hurricane, earthquake, tornado and other weather strength rating requirements presently used throughout the world. This enhanced strength is achieved primarily due to the relatively thick concrete layer 13 combined with the rigid frame 10 and further combined with the extended-depth wallboard 11 which provide internal insulation at the frame. In accordance with the present invention, a housing unit can be assembled in a matter of three or four days rather than months by utilizing the building construction system and method and automated alignment of the present invention; minimal skill is needed by the assembly crews and fabrication can be customized to meet local codes, plumbing and electrical requirements. Most single family units are anticipated to be in the twelve hundred to fifteen hundred square feet of living space. The units can be built as independent units or in multiple family configurations and, in that sense, the particular size and configuration of a given housing unit built in accordance with the present invention is not limiting.

To further enhance the ease of assembly of the construction wall section 1 of the present invention, the frame 10 is configured to lockingly receive a plurality of bolts 30 having various configurations. In some embodiments, the bolts 30 are received in flanges of the frame 10 at various points along the frame 10 as desired for the particular application. With reference back to FIG. 1, shown are two sets of bolts 30 wherein the first set is configured to receive and retain a rebar support 14 and a second set is configured to receive and retain a guide wire 15.

Figure 7A:
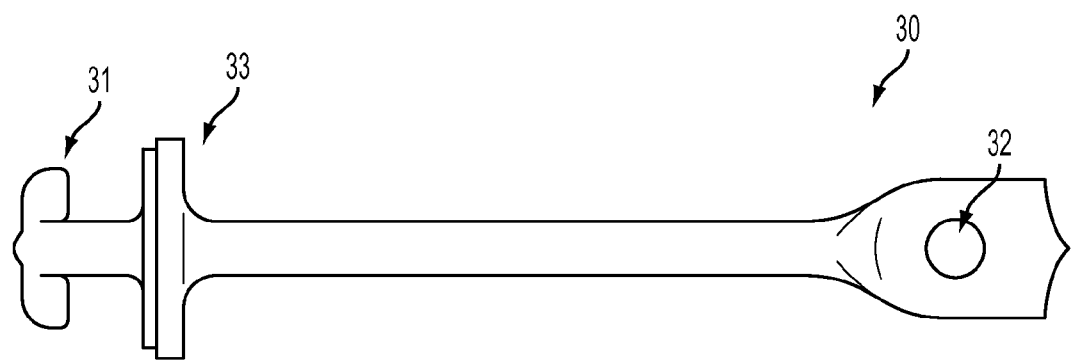
FIGS. 7A-7C depict various embodiments of the key bolts and the key hold engagement used with the frame of the present invention.
Figure 7B:
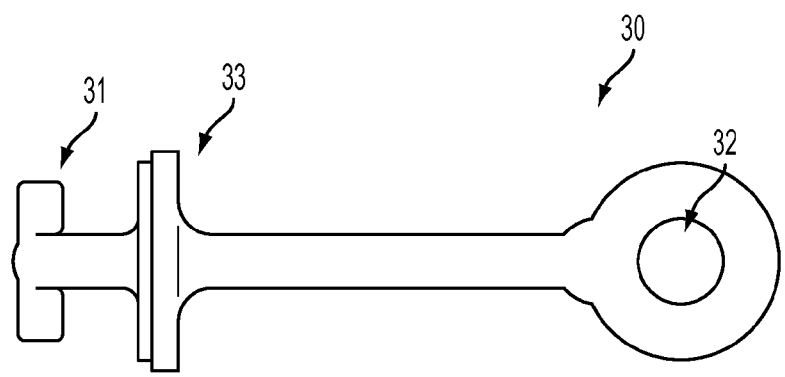
Figure 7C:
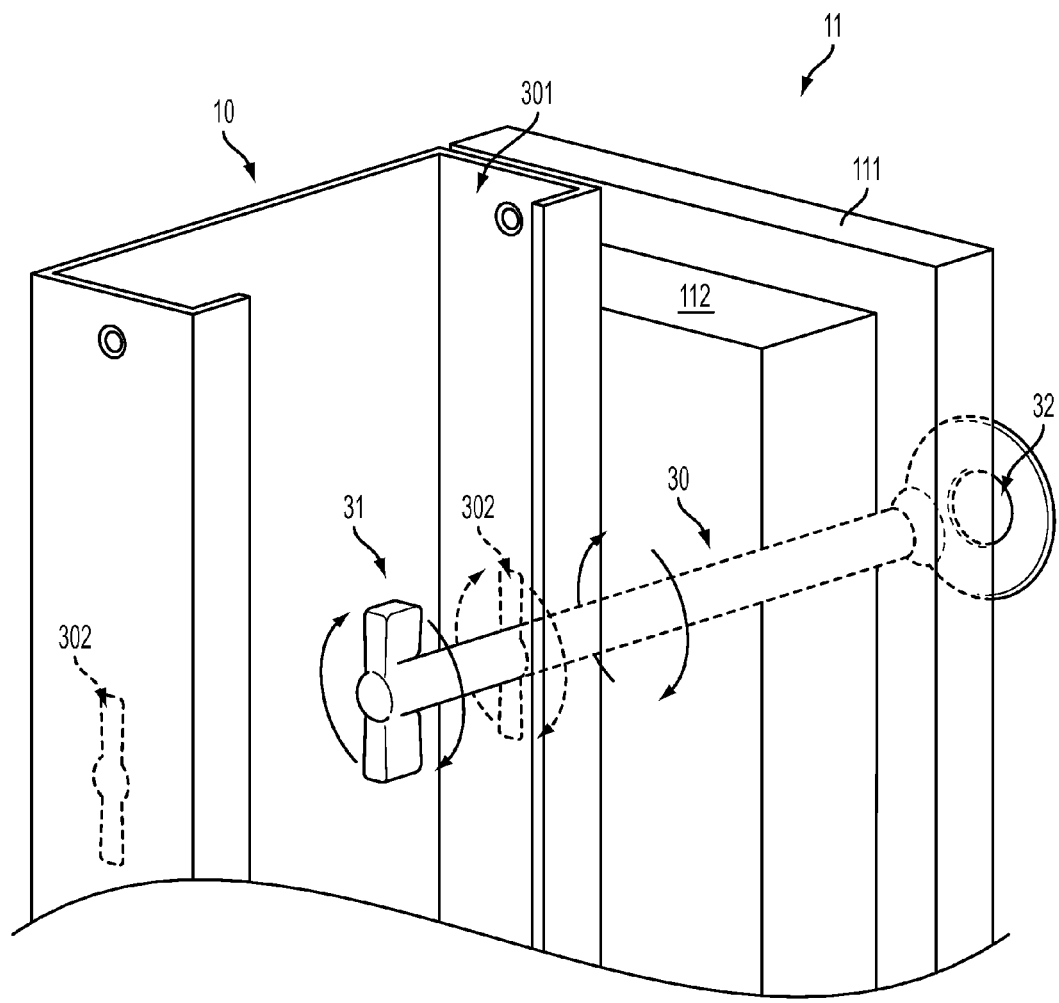

With reference to FIGS. 7A-7C, shown are various embodiments key hole/key bolt 30 configuration of the present invention. FIG. 7A depicts one embodiment of a key bolt 30 configured as a stud screed bolt. The proximal end of the bolt 30 includes a bow-tie or bubble-like male connector 31 and the distal end includes a receiving eyelet 32. A bolt flange 33 may be provided proximal to the male connector 31. In this embodiment, the receiving eyelet 32 is relatively small and is configured to receive guide wire 15. FIG. 7B depicts another embodiment of a key bolt 30 configured as a support bolt. The proximal end includes a bow-tie or bubble-like male connector 31 and the distal end includes a receiving eyelet 32. Again, a bolt flange 33 may be provided proximal to the male connector 31. In this embodiment, the eyelet 32 is somewhat larger and is configured to receive and engage a rebar support 14.

As shown in FIG. 7C, frame 10 may include one or more flanges 301 which may comprise stamped or bent portions of the frame 10. One or more key holes 302 are provided through flanges 301 and provide a point of entry for the male connector 31 of key bolts 30. In some embodiments, a key bolt 30 passes through wallboard 11 and into the key hole 31 of frame 10 and is then rotated 90 degrees such that the male connector is lockingly engaged with the flange 301 of frame 10. The key hole 302—key bolt 30 arrangement provides a simple and easy to operate means of attaching rebar and guide wire to the frame 10, which provides added support and concrete application guidance for the construction wall section 1. It is appreciated that the key holes 302 could be provided anywhere on the frame 10 and do not necessarily have to be on the flange 301. Further, with reference back to FIGS. 1-4, it is appreciated that two or more key bolts can be used in conjunction to support a rebar support 14 and/or a guide wire 15. In some embodiments, the key holes 302 are provided at equidistant points along the frame 10 and the key bolts 30 are provided therein such that the weight of the rebar 14 and/or guide wire 15 can be equally supported along the frame.

It is further appreciated that, in some embodiments, the length of the key bolts 30 utilized for the guide wire 15 are substantially longer than the length of the key bolts 30 used support the rebar 14. This configuration allows the guide wire 15 to extend well beyond the wallboard 11 surface in order to delineate the maximum depth or thickness of concrete layer 13 to be applied. Accordingly, a variety of varying length key bolt 30 for guide wire 15 can be utilized to provide a guide for various desired depths of the concrete layer 13.

The wall configuration, square footages, windows, doors, electrical, plumbing, ventilation and other requirements are placed into a take off for analyses by a computer software program for calculation of number of feet needed for frames 10, frame 10 dimensions and placement, cut outs for placement of plumbing and electrical wires, placement of windows, doors and ventilation needs, as well as sizing to meet local and national codes and best practices for the location where the homes are going to be built. The result of the multi-stage analyses is a computerized output of frame 10 requirements that can be fed into a frame fabricating machine. The frame fabricating machine then can produce the frames 10 in sections, including the cross-members and outer members needed for the construction of the unit. The frames are typically fabricated from rolled coils of sheet metal material such as steel or aluminum but may also comprise wood or other materials as suitable for the particular application. In some embodiments, a steel frame section having a 3-inch concrete layer applied thereto is capable of withstanding at least 50,000 psi of pressure and therefore is preferred as a weather-rated material in certain applications. As the entire frame structure is fabricated typically in discrete sections, the frame sections are marked at each end with a coding number. Headers and sills are likewise marked with numbers at all locations where they will interact with the frame sections or any bracing pieces, cross-members, and the like. Typically, the frame 10 sections are produced in the order of assembly, so that the pieces are assembled in the order of fabrication.

Figure 10:
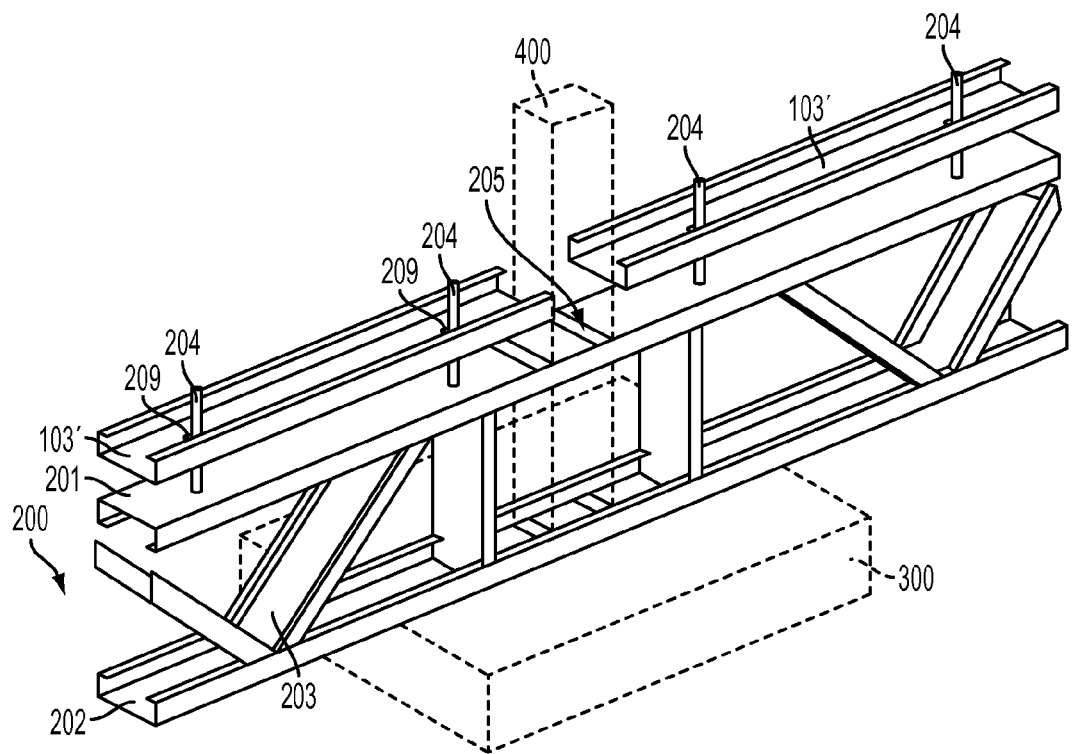
FIG. 10 is a perspective view of one embodiment of one or more base form section assemblies of the present invention installed onto a foundation footer.

The present invention also comprises an enhanced and improved system and method for constructing a building comprised of the wall sections 1 described above. This system and method provides a means to quickly and easily construct a building in accordance with a pre-determined building plan without the need for skilled laborers or the machinery and time associated with traditional tilt-up wall or block construction methods known in the art. In its basic form, FIG. 10 shows a perspective view of a base form 200 configured as a frame that is intended to be disposed around the outer perimeter of a building in multiple sections. The base forms provide a supporting template for the wall sections 1 as further described. As shown, base form 200 comprises an upper runner 201 and a lower runner 202 supported and interconnected by one or more cross runners 203, thus delimiting a frame-like structure. In some embodiments, the base form 200 comprises 16-22 ga steel, although other materials and material strengths may be utilized. In some embodiments of the system and method, one or more sections of base form 200 are disposed onto a foundation footer 300. Further, in some embodiments, a vertical support beam 400 may be disposed between one or more base form 200. A gap 205 may be provided in the base form 200 or two spaced apart but separate base forms 200 may be provided to accommodate support beam 400.

Figure 11:
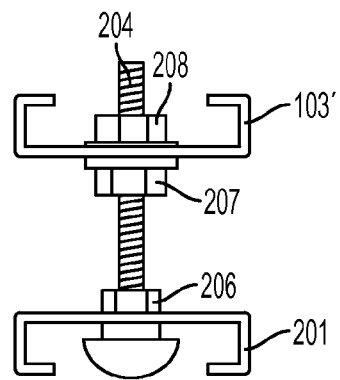
FIG. 11 is a side view of one embodiment of the fastening structure attaching an outer lower frame member of the wall section to a top runner of the base form of the present invention.

As will be described in greater detail below, base form 200 serves as both a support structure and a template for automated alignment and the construction of a building comprised of a plurality of the wall sections 1 of the present invention. Accordingly, the base form 200 is configured to engage, retain, and support a wall section 1 and, in particular, is configured to engage a bottom outer frame member 103' of a wall section 1 as shown in FIG. 10. In some embodiments, a bottom outer frame member 103' of a wall section 1 is attached to the upper runner 201 of the base form 200 by one or more bolts 204. The engagement of the bottom outer frame member 103' and the upper runner 201 is shown in FIG. 11. Here, bolt 204 passes through both the upper runner 201 and the lower outer frame member 103'. A first nut 206 is secured at the top surface of the upper runner 201, a second nut 207 is secured at the bottom surface of the bottom outer frame member 103' and a third nut 208 is secured at the top surface of bottom outer frame member 103'. In some embodiments, the bolts 204 pass through pre-drilled bolt alignment holes 209 disposed through the bottom outer frame member 103'.

Constructing a dwelling utilizing the base forms 200 and a plurality of wall sections 1 is accomplished in a simple, step-wise fashion, constituting automated construction and automated alignment of various wall sections, roof truss sections, floor truss sections and components thereof. Initially, the base forms 200 are dimensioned according to the boundary measurements of a given dwelling's foundation footprint. In some embodiments, the base forms 200 are selected and stamped out in sections that can be easily secured to the foundation footers and other supporting structure of a dwelling around the boundary thereof. Once the base forms 200 are secured to the foundation, concrete is applied to resultant foundation such that a slab is formed with the base forms 200 extended at least partially above the slab, therefore delimiting the initial portion of the walls of the dwelling. In some embodiments, the base forms 200 extend above the foundation slab of the dwelling by 1'-3'. Then, the wall sections 1 are attached to the base forms 200 to create the outer walls of the dwelling. As such, the base forms 200 are secured to the foundation to create a "template" for the wall sections 1, greatly reducing the time, cost, and complications associated with standard building construction methods and system.

Figure 12:
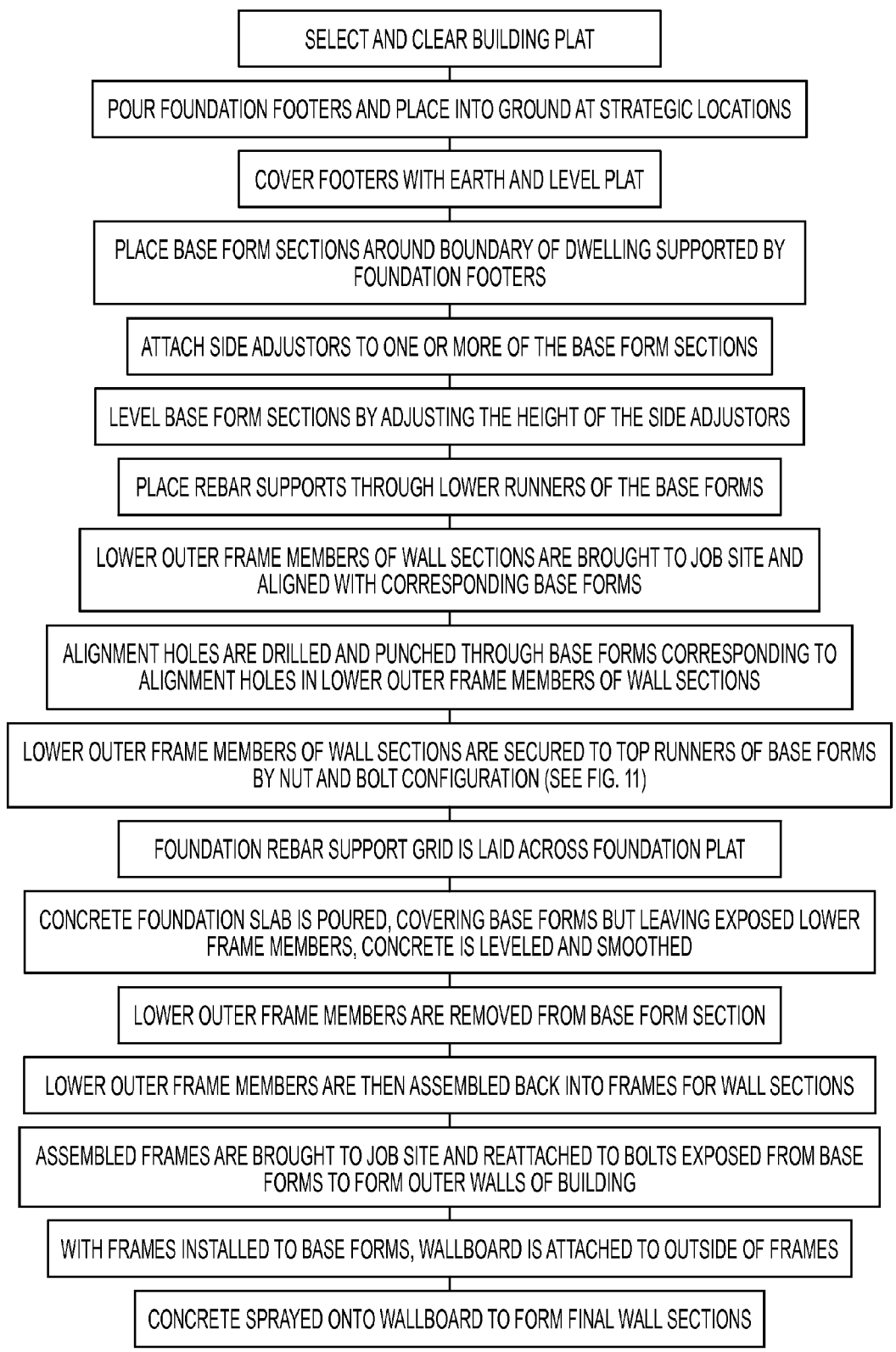
FIG. 12 is a flow chart depicting one embodiment of the construction method of the present invention utilizing base forms and wall sections described herein.
Figure 13:
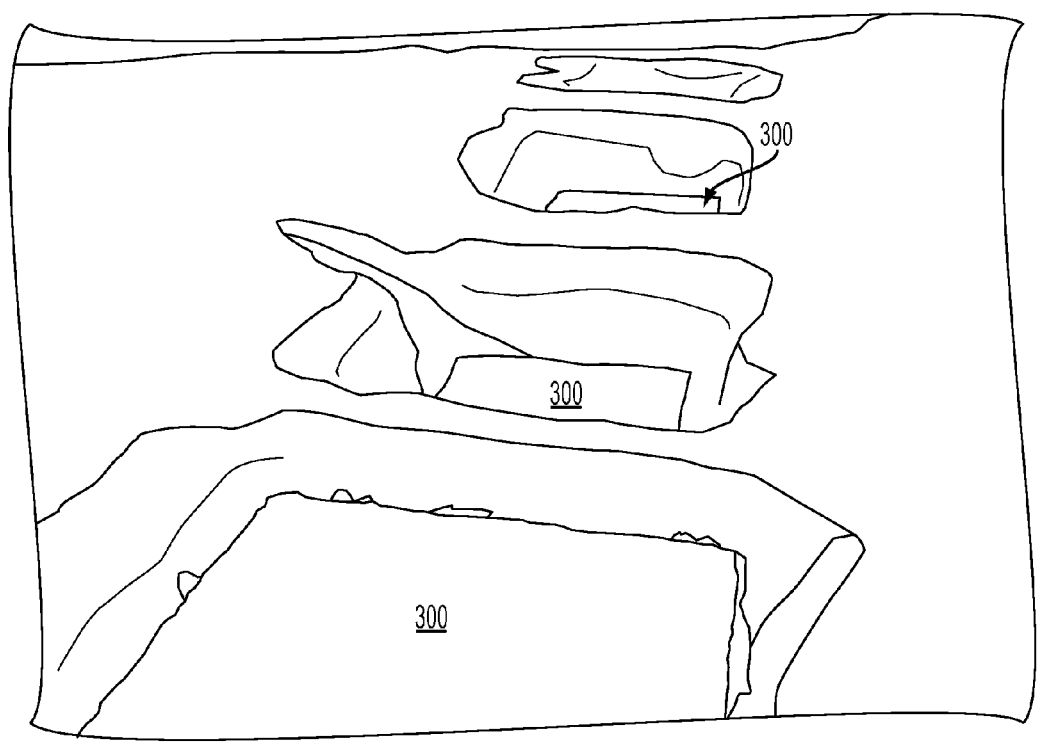
FIG. 13 shows a plurality of foundation footers disposed in the ground in accordance with the building construction method of the present invention.
Figure 14:
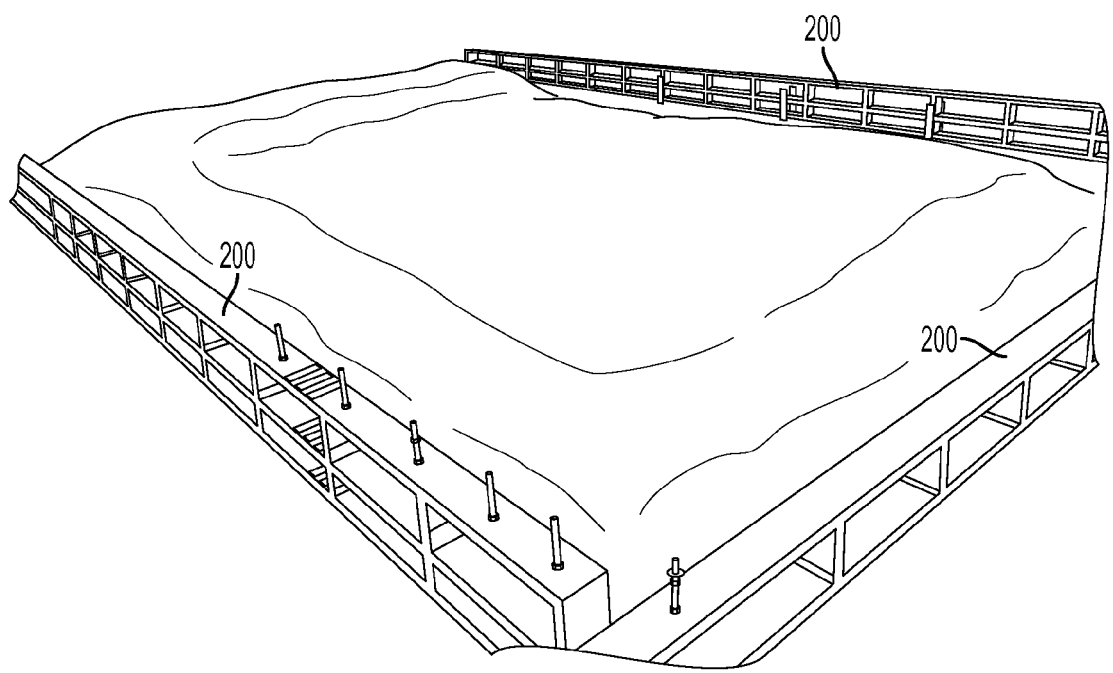
FIG. 14 shows the installation of a plurality of base form section around the boundary of a building plat in accordance with the building construction method of the present invention.
Figure 15:
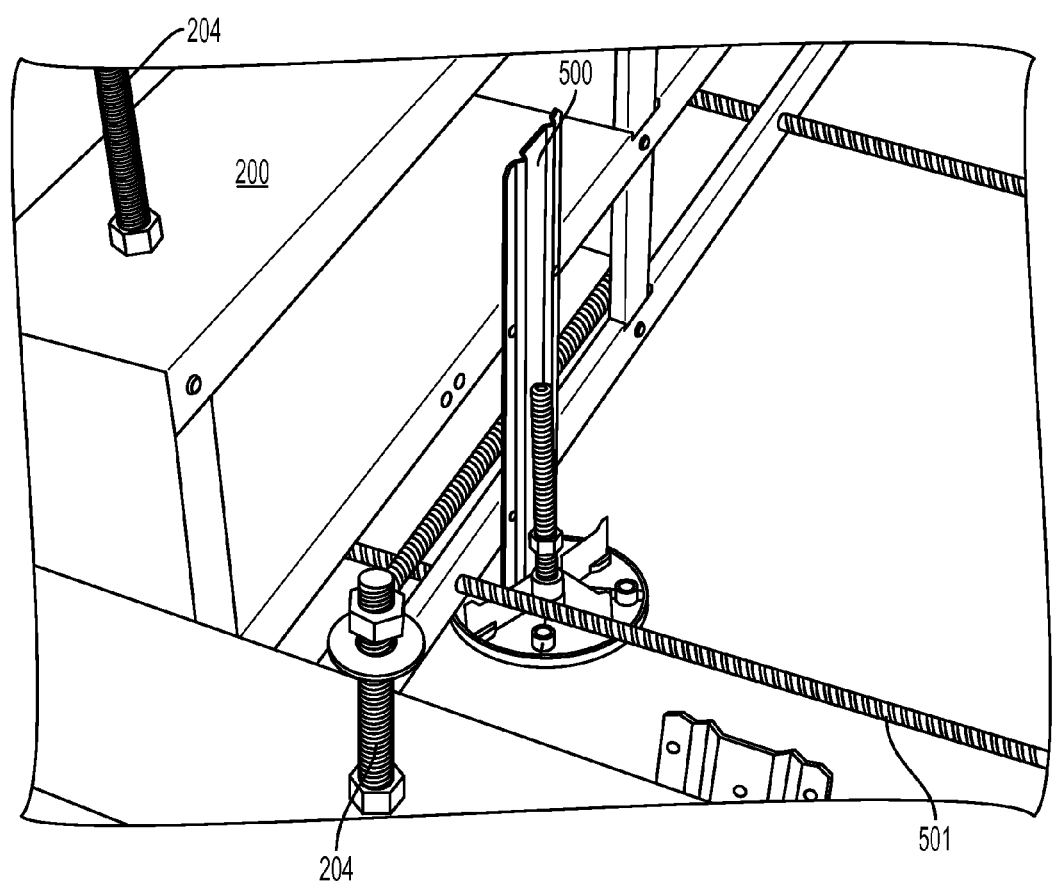
FIG. 15 shows the use of a side adjustor to level the base form sections in accordance with the building construction method of the present invention.
Figure 16:
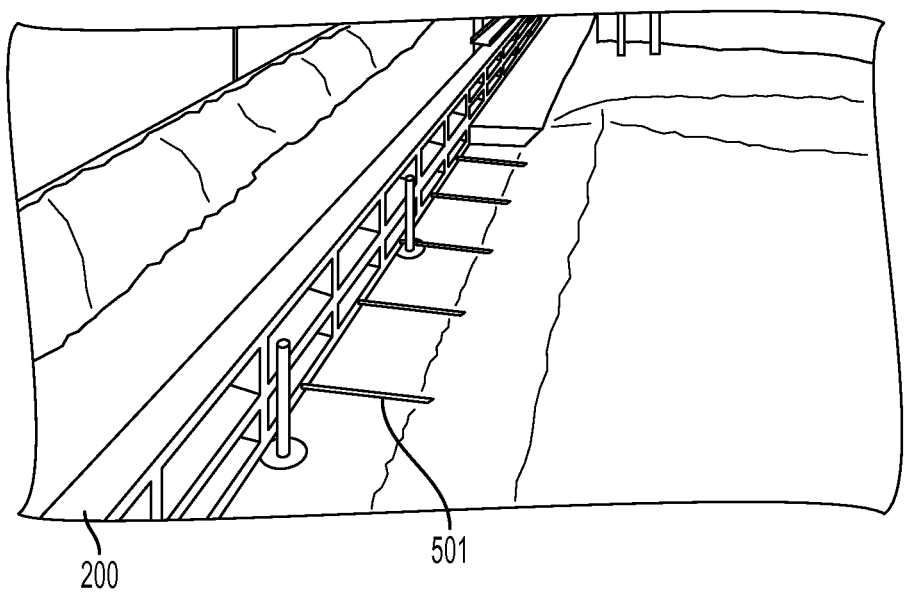
FIG. 16 shows the base forms of the present invention supported by rebar sections in accordance with the building construction method of the present invention.

This building construction methodology is shown and described in more detail in FIGS. 12 and 12A. First, the building or dwelling plat is laid out and the earth is cleared and flattened for the construction of the building's foundation. Next, one or more foundation footers 300 are poured and disposed into the ground at strategic locations around the boundary of the eventual building, as shown in FIG. 13. The footers 300 are then covered with earth in the traditional manner and the plat is leveled. Next, one or more base form 200 sections are brought to the job site and are attached to the footers 300 as shown in FIG. 10. The base form 200 sections are placed around the boundary of the building as shown in FIG. 14. In some embodiments, one or more side adjustors 500 are attached at various points along the base form 200 sections to act as levelers for the base forms as shown in FIG. 15. The side adjustors 500 temporarily support the base form 200 sections at the lower runner 202 thereof and are height adjustable in order to adjust and eventually level each of the base form 200 sections to one another and the foundation. Once the base form 200 sections are leveled, one or more rebar supports 501 are provided through the lower runners 202 of the base form 200 sections at intermittent locations thereof (See FIGS. 15&16). In some embodiments, the rebar supports 501 are equally spaced through the base form 200 sections at, for example, 2 feet increments. FIG. 16 shows and exemplary embodiment of the base form 200 sections each having a rebar support 501 disposed through the lower runners 202 thereof. If desired, lateral straps can be utilized to connect to opposite base form sections 200 to prevent side-by-side movement, lateral movement, undesired slippage, rotation or angular displacement of these sections, as well as roof truss sections, floor truss sections, wall sections or the like.

Figure 17:
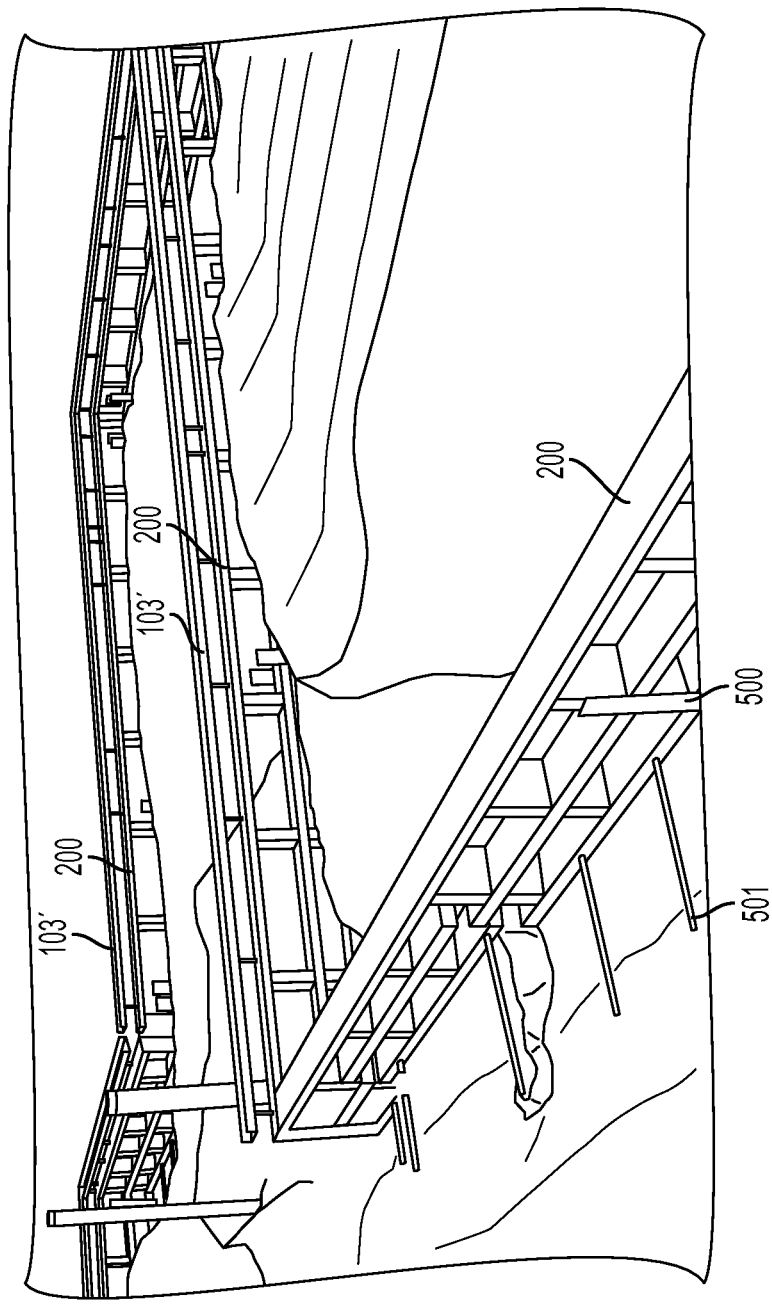
FIG. 17 shows a plurality of lower outer frame members of the wall sections attached to the base forms in accordance with the building construction method of the present invention.
Figure 18:
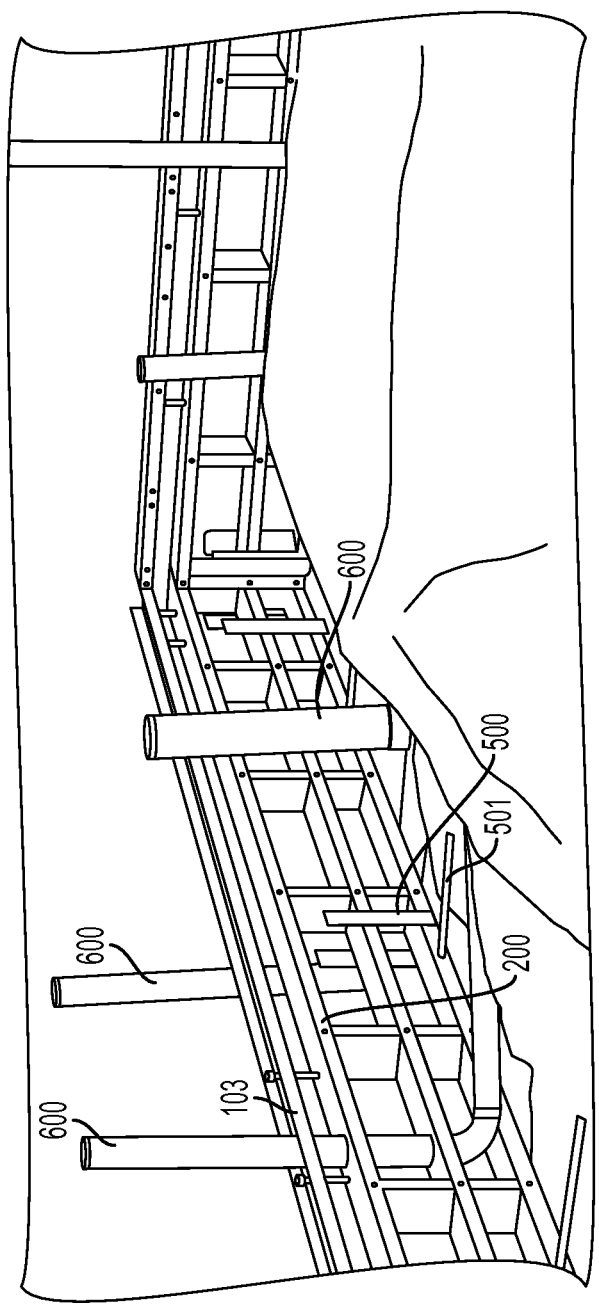
FIG. 18 shows an up close view of a plurality of lower outer frame members of the wall sections attached to the base forms further including plumbing features in accordance with the building construction method of the present invention.
Figure 19:
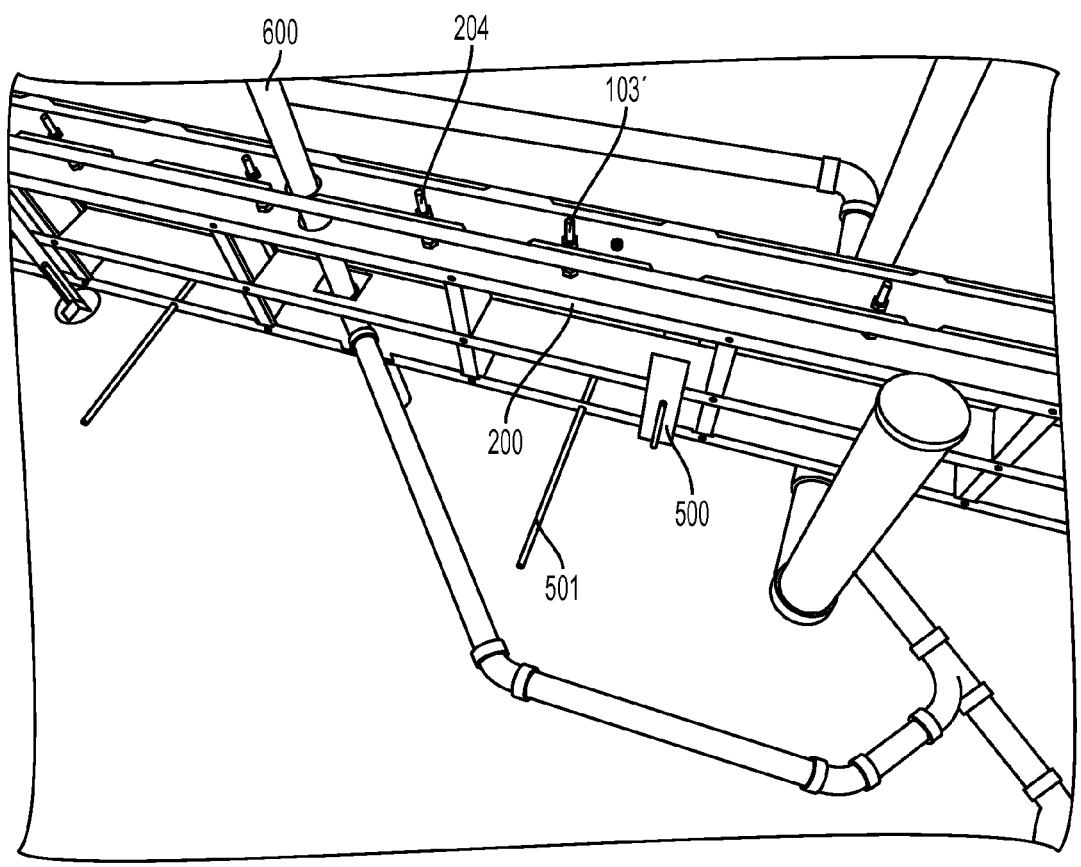
FIG. 19 is a top view showing a plurality of lower outer frame members of the wall sections attached to the base forms further including plumbing features in accordance with the building construction method of the present invention.
Figure 20:
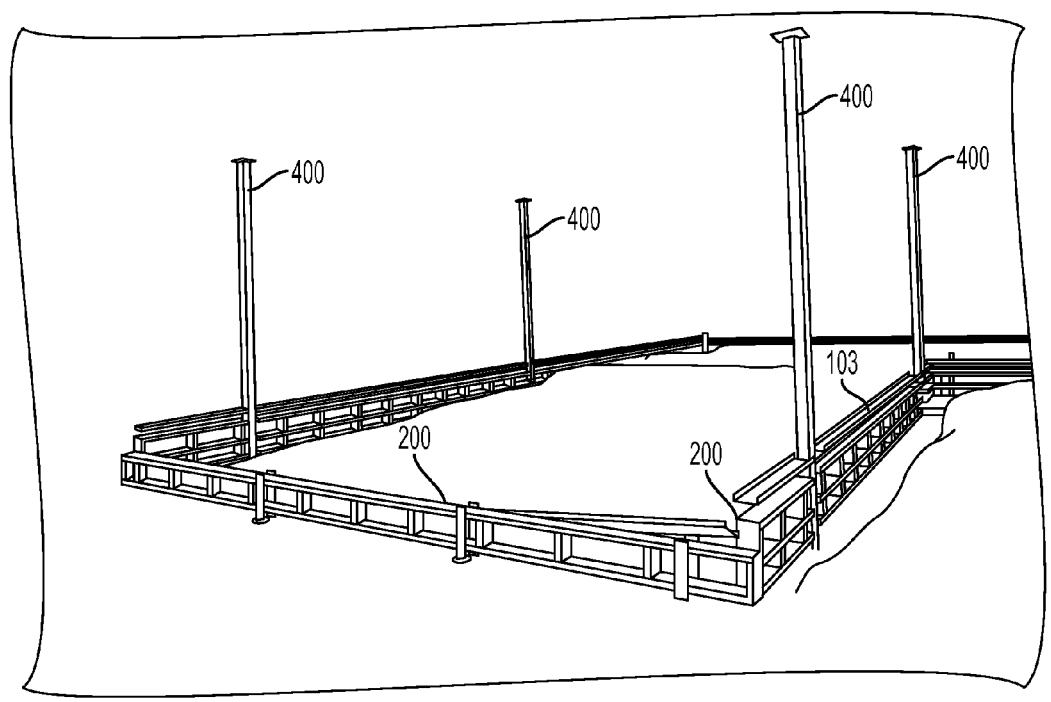
FIG. 20 is another view showing the base forms surrounding one or more support beams in accordance with the building construction method of the present invention.

After the base form 200 sections are leveled and stabilized with the rebar supports 501, the wall sections 1 can start to be secured to the base form 200 sections. It is appreciated that the building will be comprised of a plurality of wall sections 1 having varying dimensions according to the requirements of the building plan. For example, wall sections 1 may be provided in various widths such as 10 feet, 8 feet, 7 feet, and the like provided they are dimensioned to meet the requirements of the building boundary and the construction plan. With that in mind, in some embodiments, the lower outer frame members 103' of each wall section 1 are brought to the job site and aligned with their corresponding base form 200 sections along the boundary of the building. The alignment holes 209 of the frame members 103' are aligned with the base form 200 top runners 201 and corresponding alignment holes are drilled or punched through the top runners 201 of each base form 200 section. Next, the bottom frame members 103' are attached to the base forms by the nut and bolt configuration shown in FIG. 11. FIG. 17 shows the base form 200 sections with attached outer lower frame members 103'. FIG. 18 shows the base form 200 sections with outer lower frame members 103' wherein one or more plumbing features 600 are provided through the base form 200 sections and the members 103'. In this manner, plumbing and electrical can be placed throughout the foundation structure in an easy and efficient manner prior to placing the walls or pouring the final foundation slab. FIG. 19 is a top perspective view sowing the frame members 103' attached to the base form 200 sections by the one or more bolts 204. Also shown are the plumbing features 600. As shown in FIG. 10, the base form 200 sections may be supported by one or more beams 400. FIG. 20 shows a plurality of the support beams 400 at various locations around the boundary of the plate disposed between base form 200 sections.

Figure 21:
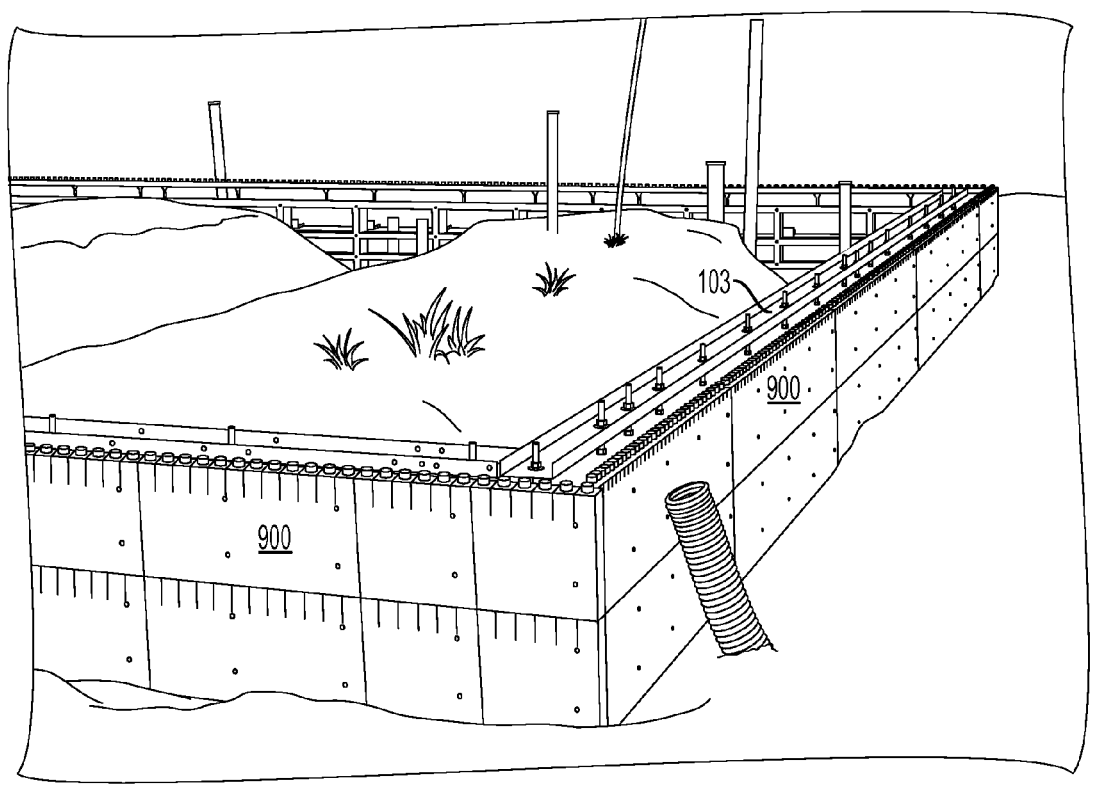
FIG. 21 shows a plurality base form sections surrounded by a retaining wall sections in preparation for a concrete pour in accordance with the building construction method of the present invention.
Figure 22:
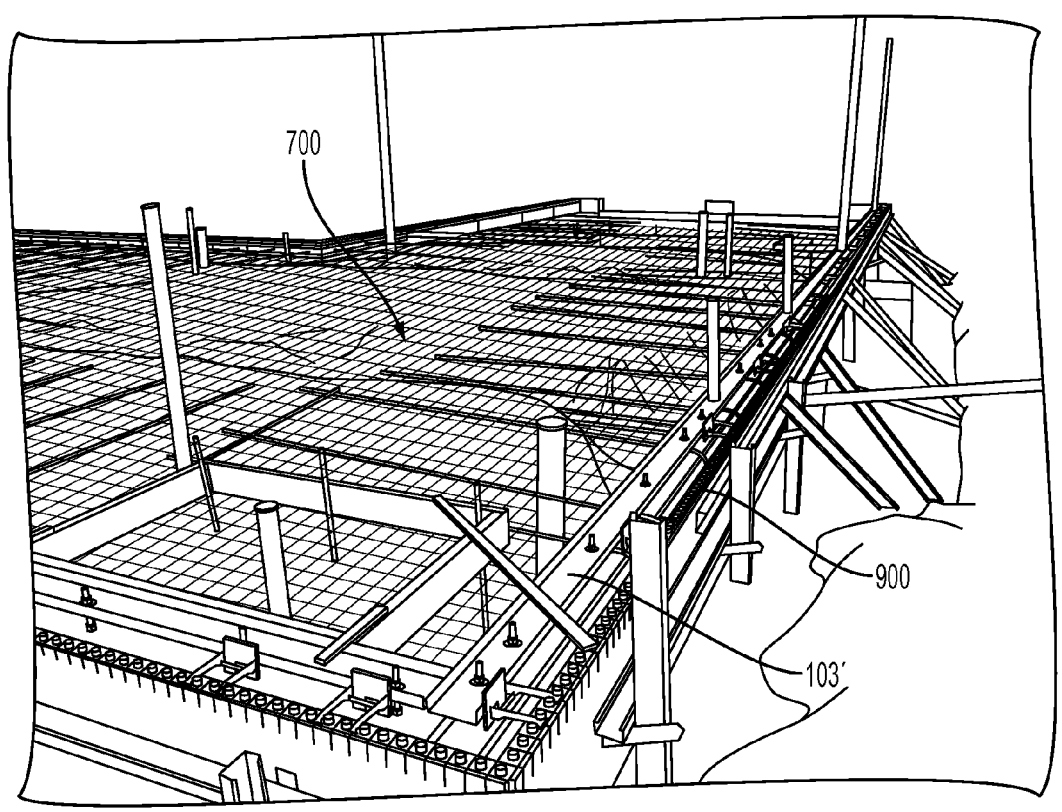
FIG. 22 shows a rebar support grid laid on the building plat in preparation for a concrete pour in accordance with the building construction method of the present invention.
Figure 23:
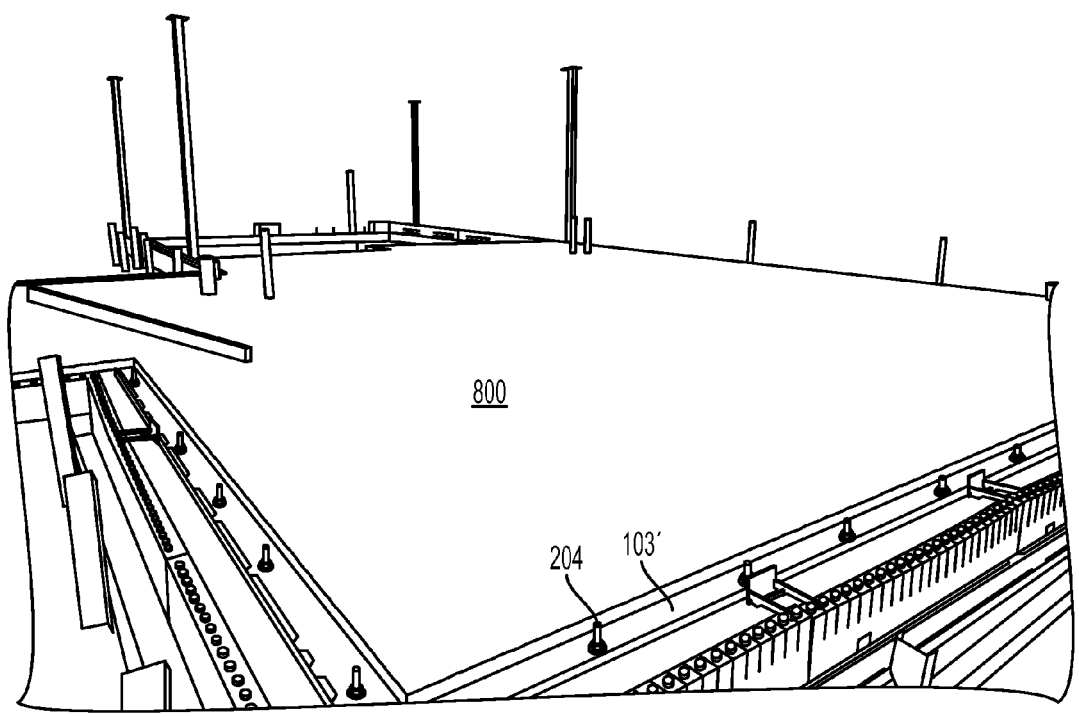
FIG. 23 shows the concrete foundation slab with the lower outer frame members exposed for removal in accordance with the building construction method of the present invention.

Next, with the outer lower frame members 103' in place and attached to the base form 200 sections, foundation rebar support grid 700 is placed inside the boundary of the foundation and concrete is poured onto the entire foundation structure to form a final concrete foundation slab 800. To assist in retaining the concrete during pouring, one or more permanent or temporary retention wall sections 900 can be disposed and/or attached to the outside of the base form 200 sections as shown in FIG. 21. FIG. 22 shows the rebar support grid 700 and FIG. 23 shows an exemplary final concrete foundation slab 800 after concrete is poured to fill the plat. The concrete is poured onto and through the base form 200 sections and is then smoothed and leveled to an elevation at least reaching the top runner 201 of the base form 200 sections. This leaves the lower outer frame members 103' of the wall sections 1 and the bolts 204 exposed for further construction as described below.

Figure 24:
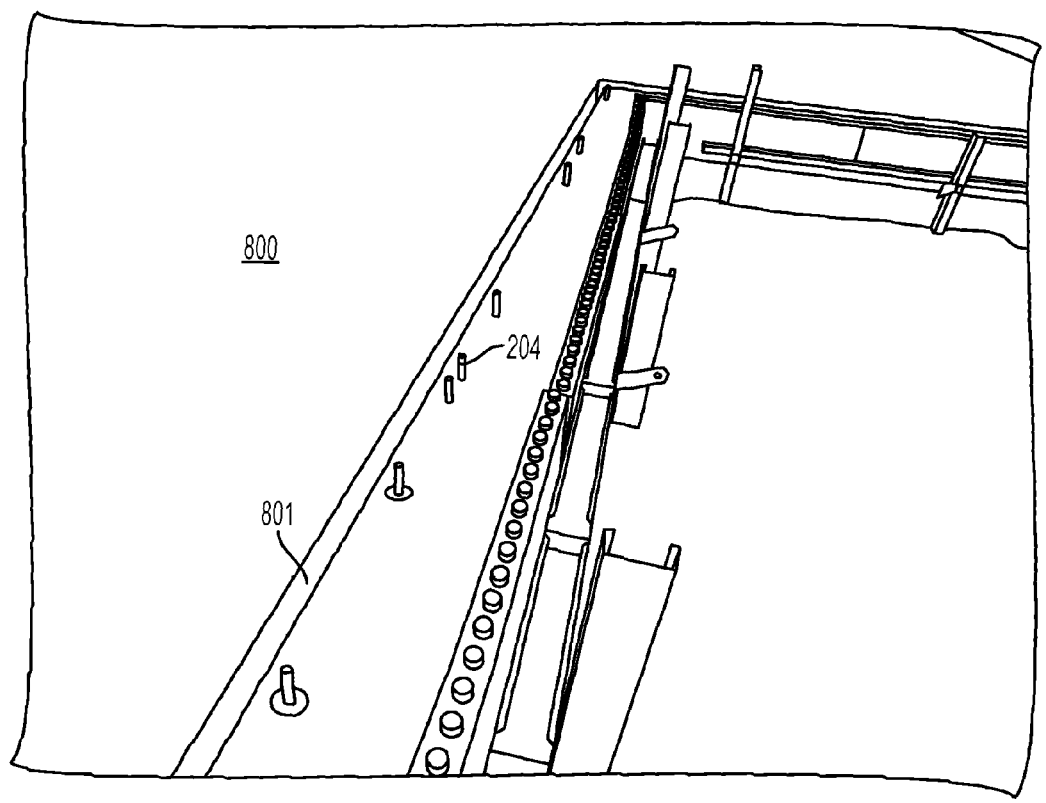
FIG. 24 shows the concrete foundation slab with the attachment bolts exposed for later installation of wall sections in accordance with the building construction method of the present invention.
Figure 25:
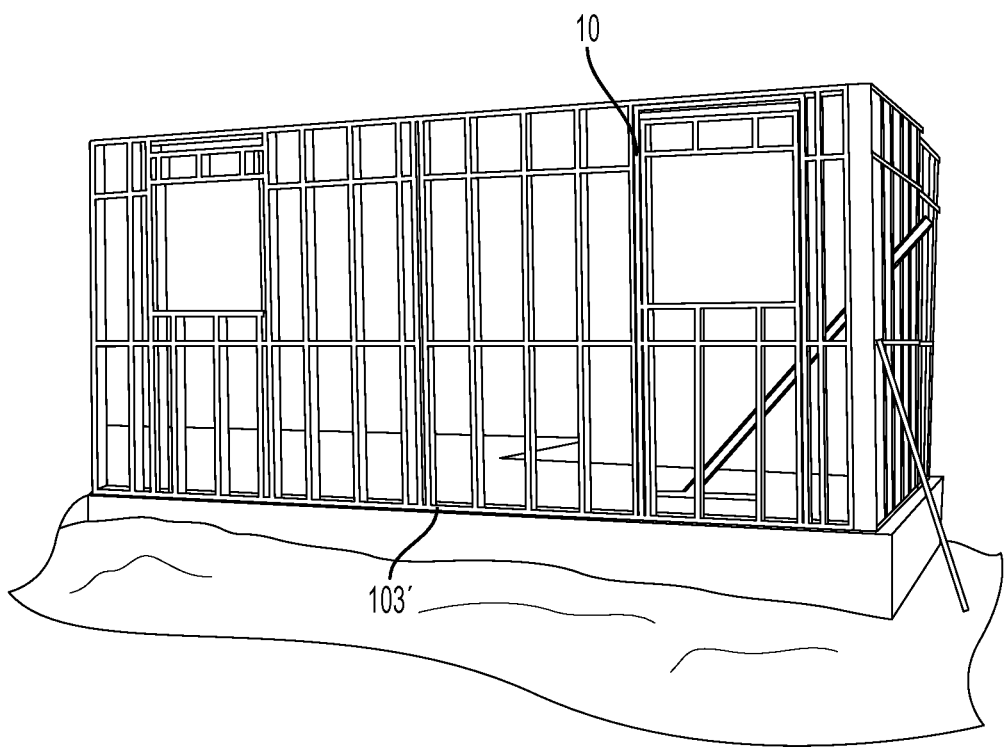
FIG. 25 shows a plurality of wall sections attached to the base forms in accordance with the building construction method of the present invention.
Figure 26:
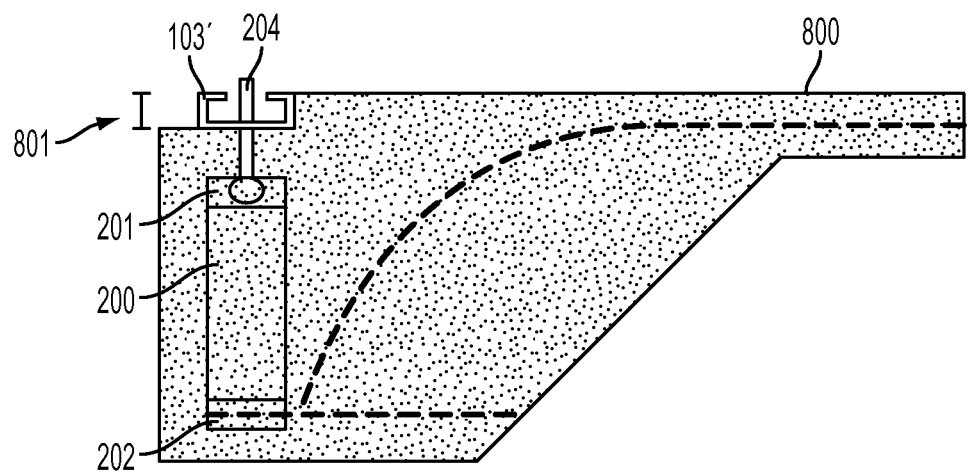
FIG. 26 is a cross-sectional view of a concrete foundation slab having a base form section embedded therein with bolts for attachment to the wall frames exposed.
Figure 27:
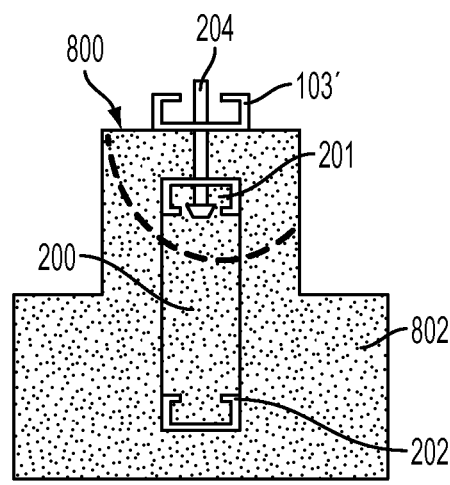
FIG. 27 is a cross-section view of a stem wall foundation configuration having a base form of the present invention embedded therein for attachment and support of a frame member of a wall section of the present invention.

Next, the concrete is permitted to cure and then the exposed outer lower frame members 103' are removed from the base form 200 sections with the bolts 204 left in place in the top runners 201 of the base form 200 sections. FIG. 24 shows the exposed bolts 204 with concrete surrounding and covering the base form 200 sections. The frame members 103' are then attached (or reattached) to their corresponding frame 10 of wall section 1. The assembled frames 10 are then brought to the job site (after concrete foundation slab is cured) and are each reattached to the corresponding bolts 204 exposed above the base form 200 sections as shown in FIG. 25. As shown in FIG. 26, in some embodiments, the concrete foundation 800 is poured to an elevation above the base form 200 sections such that the sections are completely encased within the foundation slab 800. As referenced above, lateral straps can be utilized to connect to opposite base form sections 200 to prevent lateral movement, undesired slippage, rotation, or displacement of these sections in assembly, and while the concrete foundation is poured, sprayed and/or cures. The surface of the concrete foundation slab 800 is stepped where 801 points in order to accommodate the lower outer frame member 103' which is generally not covered in concrete when installed onto the base form 200 sections. The step 801 is also shown in FIG. 24. This step leaves room for the installation of the frames 10 and is dimensioned specifically to receive the lower outer frame member 103' of each frame 10. Here, the bolts 204 extend upward and are exposed to provide a mounting point for the frame members 103'. In some embodiments, such as that shown in FIG. 27, the base form 200 section may be disposed in a stem wall foundation 802 section forming a part of the concrete foundation slab 800. Again, the depth of the concrete is poured such that the bolts 204 extend above the concrete surface with sufficient depth to accommodate the lower outer frame member 103' of a given frame 10 of a wall section 1.

Once the frames 10 are in place on the base forms 200, interior walls and trusses are attached. The automated alignment system is utilized such that the bottom portion of a truss section and top portion of a wall section are attached with pre-determined bolt holes where the truss is placed accurately and properly spaced without the need for field measurements or assembly of components. Wallboard 11 is attached to the now completed and attached frames 10 and the wall sections are constructed in the manner described above substantially as shown in FIGS. 1-9. Thus, the exterior sides 101 of frames 10 are covered with the wallboard 11, therefore providing internal and external insulating properties, which inset portion 112 of the wallboard 11 is received in the cavities 140 of the frame 10. The wallboard 11 may be secured to the frame 10 by an adhesive, epoxy, or the like. The wallboard may be further affixed to the frame 10 sections with fasteners and/or, in some embodiments, key bolts 30 may be provided through the wallboard therefore providing two purposes (1) provide additional fastening of the wallboard 11 to the frame and (2) provide a means to attach rebar 14 and/or guide wire 15 to the assembly. If rebar supports 14 are desired, the supports are provided into the eyelets of the one or more key bolts 30. Grid 12 may be then fastened to the bolts 30 or the rebar 14 by wire ties 35, whereby the grid 12 helps with the application of concrete layer 13 and adds tensile strength to the concrete layer 13. If a guide wire 15 is desired, it is secured through the eyelets of one or more key bolts and thus the guide wire 15 may define the depth of concrete layer 13 to be applied over the wallboard 11. It is appreciated the wallboard 11 is configured with channels 113 that match the configuration of the frame 10, including any cross members 104 and conduits 106 as desired.

Figure 9:
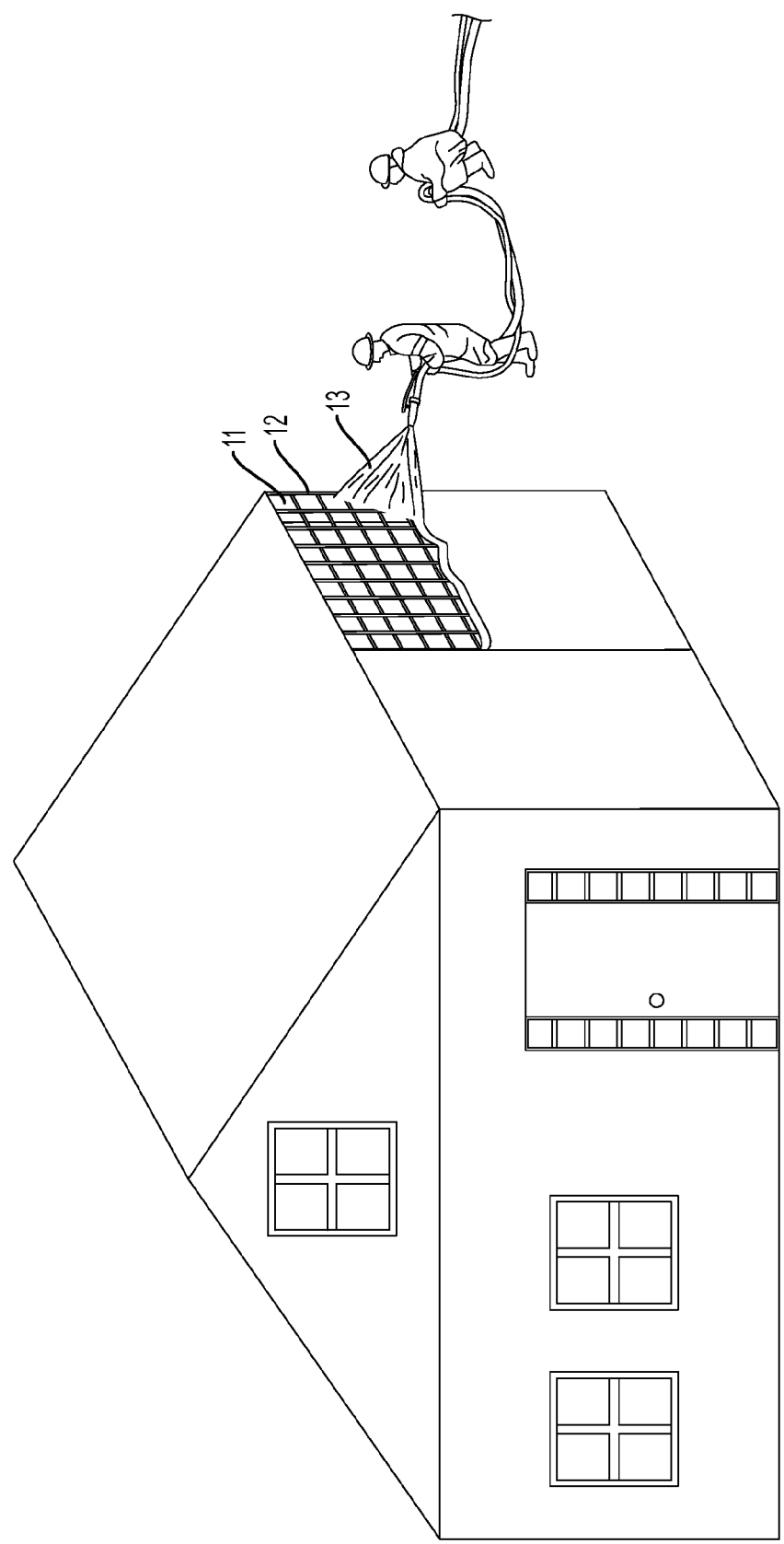
FIG. 9 is a schematic of a concrete layer being sprayed onto the wallboard/frame in accordance with the present system and method.

The concrete layer 13, in some embodiments, is applied by a spraying application and depicted in FIG. 9. Multiple thin layers of concrete may be applied until the concrete layer 13 has a suitable thickness, for example 2-3 inches. In some embodiments, the guide wire 15 designates the depth of the concrete application. It is desirable for the grid 12 and the rebar 14 to be located substantially in the middle of the concrete layer and thus the grid 12 and rebar 14 are spaced apart from the wallboard 11 and the final outer wall surface of the concrete layer 13. Once the concrete layer 13 has cured, the housing structure is formed and finishing can take place. Roof frame 10 sections may be constructed in a similar manner but would typically be covered with a roofing material of choice as wallboard 11, preferably a material that provides good water resistance and good insulation.

Figure 8:
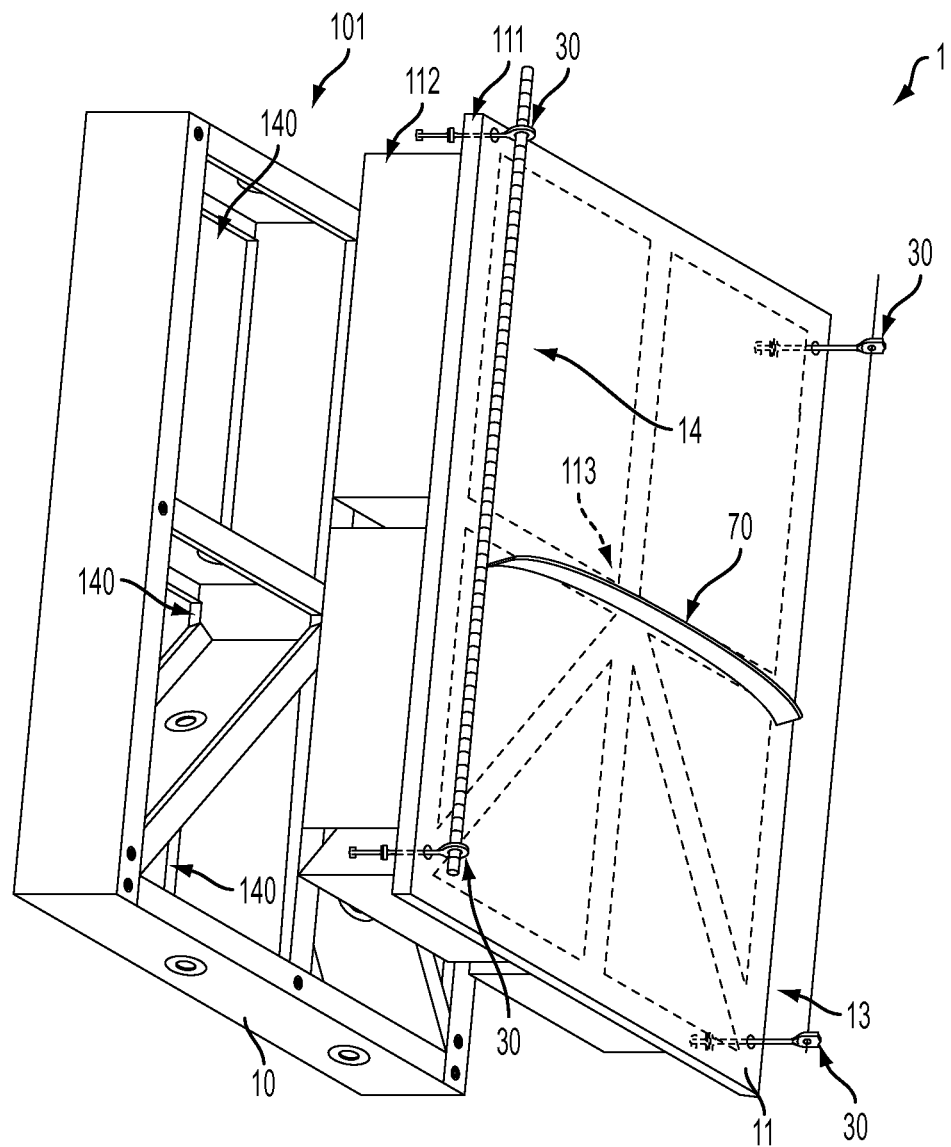
FIG. 8 is a perspective view of another embodiment of the present invention, utilizing support arches useful for concrete application.

With reference to FIG. 8, to further assist in the concrete layer 13 application and particularly with respect to multiple story or multiple level applications, one or more support arches 70 may be secured to one or more bolts 30. The arches 70 may comprise strips of metal or other rigid material and have a width that extends outwardly from the surface of the wallboard 11. The arches 70 may be disposed between the wallboard 11 and the wire grid 12 and are provided in order to catch the concrete layer 13 during the spraying application.

The geometry and location of the arches 70 is not limited, and other similar strips may be provided on the wallboard 11 to effectuate this purpose.

The wallboard 11 may comprise a variety of building construction materials known in the art and is particularly useful because it provides both external and internal insulation in a single, easy to install piece. In some embodiments, the wallboard 11 comprises a suitable expanded polystyrene material providing insulative properties. In some embodiments, the wallboard 11 comprises what is known in the art as "blueboard" which is configured to accept and react with the cement layer 13 for optimal adhesion and durability. Other foam-like materials may be utilized as wallboard 11 and such materials may be chemically treated to accept adherence of cement. As is known in the art, "blueboard" is typically a foam-board insulation material comprising polyisocyanurate, extruded polystyrene, expanded polystyrene foam, and combinations thereof. The wallboard 11 material may be selected according to its "R-value" or thermal resistance value and may preferably have an R-value between 4.5 and 5.0, which is typical of blueboard known in the art. However, in some embodiments the wallboard 11 comprises primarily expanded polystyrene which may have an R value of 12 or greater, depending on the overall thickness. Such an R-value provides a significant improvement over typical construction methods. It is appreciated, that other materials including composite styrofoam, foam and foam-like boards known in the art are contemplated, provided they have improved insulation, strength, and plaster/cement adherence characteristics. In any event, it is appreciate that the present invention provides a significant advantage over the prior art because the wallboard 11 provides both internal and external insulation as well as providing a surface for the concrete layer 13 to adhere to.

The application of the concrete layer 13 is quickest and most efficient when sprayed, as shown in FIG. 9. The concrete mix can be customized with additives to get better adherence to the wallboard 11 and can be adjusted as to drying time. Further use of elastomeric additives to the concrete reduces cracking of the concrete surface, and helps in creating a watertight envelope. The thickness of the concrete is a function of the strength desired and for commercial type installation it may be increased.

As mentioned above, interior walls can be covered with typical drywall materials and if additional insulation is desired it can accomplished by using blown in insulation, batting, or board type, installed on the interior side 102 of the frame 10. However, additional insulation is not necessary in most instances because of the substantial external and internal insulative properties of the extended wallboard 11. The exterior concrete, after curing, can be painted or finished with a finishing material such as stucco to provide the desired appearance. When constructing multiple identical units, the product can be quickly assembled and made ready for use. The method of construction of the units consists of fabricating the frames, marking the frames, assembling the frames in the walls, trusses and assemblies, covering the exterior walls with the wall board, adding the grid to the exterior surface of the wall board; spraying the exterior with wall board with the desired amount of cement; allowing the concrete to cure. By following these steps a very strong structure for an affordable quickly built housing or commercial units is obtained.

The combined concrete, with board and frame structure creates a composite structure with unexpected strong properties to resist earthquake, hurricane, tornado and other disruptive effects as well as provide incredible internal and external insulative properties for the given weight and cost of the materials. The final product has superior strength for a housing unit that can be quickly and economically constructed with a labor for having minimal skill sets. There are numerous variations that can be employed with respect to the materials selected in order to meet the local conditions and to accommodate the need being addressed.

The automated building construction methods and automated alignment of components as described herein are to be distinguished from conventional building construction in several distinct ways. Stick Framing is a hand built framing, with either wood or steel studs and is a slow process, components which are not square or accurately cut and manually assembled at the job site. Conventional construction involves taking all the framing and trusses to a job site, and the house is framed and built thereafter. All walls are field measured and trusses attached using string line or filed laser techniques attempting to achieve proper alignment. This is an inefficient and slow process which invariably results in numerous errors.

The instant automated framing is a frame that's accurately cut within $\frac{1}{16}$ of inch for the exact wall and for a precise location of the house being constructed. This wall framing is exported from a CAD blue pint of the house. The process is fast, inherently accurate, maintains proper squared sections and is extremely cost effective.

In one aspect of the automated method, a bottom cord truss has a hole 18 inches in from the heal or end of the truss. The exterior receiving wall where the truss is to be placed has a dowel bolt protruding from the center of the wall in the exact location where the truss needs to be received. The slab takes the peripheral dimensions of the house, for example with an offset by 8 inches (3 inches for the concrete and 1 inch for the foam×2, for each side of house, =8 inches).

As a further example, a house back of house is 25 feet 5½ inches. The instant slab generic box is made at 25'5½", and the side adjustors are added (used for leveling). The walls that are going to be placed on this house section consist of 3 walls W1, W2, and W3. These bottom plates of these walls are placed on the top of the slab box which is used as a template for the placement of the bolts for wall attachment to the concrete slab. All bolt holes are then drilled into the top of the slab for perfect alignment. Thereafter, a 6 inch bolt is placed into a hole, and is attached by a nut. Then another nut is placed 4½ inches apart. The receiving wall W1 bottom base plate is then positioned on top of the 4½ inch bolt, nut and washer. At this point another washer and nut is screwed on top of the bolt to firmly lock in the W1 bottom base plate. This W1 base plate is left in place until the slab hardens. The W1 base plate is then removed from slab. The W1 bottom base plate is thereafter attached to the whole W1 frame wall at a factory or assembly location remote from the job site. This completed W1 wall frame is thereafter delivered to the job site and the entire wall frame assembly is attached in exactly the correct location on the slab, because of the inherently accurate automated alignment system described and claimed herein. The same process is utilized with respect to the roof truss, floor truss and interior wall sections as desired.

In some embodiments, the frame, wall, floor, roof and truss sections are manufactured using a computer software system that pre-fabricates the hole or code placement into top tracks for easy assembly and inherent alignment of sections as described herein.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A composite building construction system, comprising:
a base form comprising an upper runner, a lower runner, said upper runner and said lower runner supported and interconnected by one or more cross runners;
a wall section comprising a frame, a wallboard, and a concrete layer wherein said wallboard is attached to an outer side of said frame, said wallboard providing exterior and interior insulation for said system, wherein said concrete layer is provided on said outer portion of said wallboard;
wherein said base form supported by a foundation footer;
wherein said upper runner of said base form is configured to receive and support a lower outer frame member of said frame of said wall section; and
wherein said base form comprises at least a portion of a support structure that supports said wall section.

2. The composite building construction system of claim 1, further comprising one or more rebar supports attached to said frame at said exterior side of said frame.

3. The composite building structure of claim 2, wherein said rebar supports are secured to one or more key bolts lockingly engaged with said frame.

4. The composite building construction system of claim 3, further comprising a wire grid attached to said one or more key bolts and spaced apart from said wallboard, said grid and said rebar supports supporting said concrete layer.

5. The composite building construction system of claim 1, wherein said concrete layer has a thickness of 3 inches.

6. The composite building construction system of claim 1, wherein lower outer frame member includes one or more holes configured to receive a bolt, said bolt received through said lower outer frame member and said top runner of same base form to secure said frame member to said base form.

7. The composite building construction system of claim 1, further comprising one or more guide wires attached to said frame by key bolts at said exterior side of said frame, said guide wires spaced apart from said unitary wallboard and adapted to indicate the depth of said concrete layer.

8. The composite building construction system of claim 1 wherein said frame member is prefabricated and coded for assembly.

9. The composite building construction system of claim 1, wherein an interior side of said frame is configured to receive drywall.

10. The composite building construction system of claim 1, wherein said frame comprises steel.

11. A compositing building construction system, comprising:
a plurality of base form sections disposed around the boundary of a building plat, each of said base form sections including an upper runner and a lower runner, said upper runner and said lower runner unconnected by one or more cross runners;
a plurality of wall sections, each of said wall sections comprising a frame having a lower outer frame member;
wherein said base form supported by a foundation footer of said building plat; and
wherein said upper runner of said base form is configured to received and support said lower outer frame member of a corresponding wall section in automated alignment.

* * * * *